(12) United States Patent
Ishida et al.

(10) Patent No.: US 6,978,327 B1
(45) Date of Patent: Dec. 20, 2005

(54) DATA TRANSFER CONTROL DEVICE AND ELECTRONIC EQUIPMENT FOR PERFORMING DATA

(75) Inventors: Takuya Ishida, Sapporo (JP); Yoshiyuki Kamihara, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 454 days.

(21) Appl. No.: 09/787,077

(22) PCT Filed: Jul. 12, 2000

(86) PCT No.: PCT/JP00/04637
§ 371 (c)(1),
(2), (4) Date: Mar. 14, 2001

(87) PCT Pub. No.: WO01/06708
PCT Pub. Date: Jan. 25, 2001

(30) Foreign Application Priority Data
Jul. 15, 1999 (JP) ............................... 11-201248

(51) Int. Cl.[7] ..................... G06F 13/00; G06F 3/00; G06F 15/16
(52) U.S. Cl. ................ 710/100; 710/3; 710/4; 710/9; 710/33; 709/206; 709/236; 709/233
(58) Field of Search .................... 710/3, 4, 29, 32, 710/33, 40, 58, 59, 240, 9, 100; 709/236, 709/206, 233, 9

(56) References Cited

U.S. PATENT DOCUMENTS

| | | | |
|---|---|---|---|
| 5,499,374 A * | 3/1996 | Di Giulio et al. | 710/240 |
| 5,559,801 A * | 9/1996 | Lo | 370/412 |
| 5,590,124 A * | 12/1996 | Robins | 370/258 |
| 5,724,517 A * | 3/1998 | Cook et al. | 709/227 |
| 6,038,625 A * | 3/2000 | Ogino et al. | 710/104 |
| 6,108,718 A * | 8/2000 | Fujimori et al. | 710/9 |
| 6,185,622 B1 * | 2/2001 | Sato | 709/233 |
| 6,219,697 B1 * | 4/2001 | Lawande et al. | 709/221 |
| 6,304,553 B1 * | 10/2001 | Gehman et al. | 370/235 |
| 6,347,097 B1 * | 2/2002 | Deng | 370/498 |
| 6,366,964 B1 * | 4/2002 | Shima et al. | 710/8 |
| 6,628,607 B1 * | 9/2003 | Hauck et al. | 370/216 |

FOREIGN PATENT DOCUMENTS

EP          0 939 530 A2      9/1999

(Continued)

OTHER PUBLICATIONS

U.S. Appl. No. 09/787,129, filed Mar. 14, 2001, Ishida.

(Continued)

Primary Examiner—Jeffrey Gaffin
Assistant Examiner—Angel L. Casiano
(74) Attorney, Agent, or Firm—Oliff & Berridge, PLC

(57) ABSTRACT

The objective of the present invention is to provide a data transfer control device that enables a reduction in the processing load on the firmware during the occurrence of a bus reset, and electronic equipment using the same. A data transfer control device in accordance with the IEEE 1394 standard generates a bit BT that toggles whenever one received packet and the next received packet are received in different bus reset intervals, and comprises that BT in the header of each packet stored in RAM. Bus reset pointers (a bus reset header pointer and a bus reset ORB pointer) that indicate a bus reset boundary in RAM are provided, enabling simple differentiation between a packet received before a bus reset occurred and a packet received after the reset. If transmission has been halted by the occurrence of the bus reset, the bus reset transmission halt status is passed to the firmware via a register.

14 Claims, 28 Drawing Sheets

FOREIGN PATENT DOCUMENTS

| | | | | |
|---|---|---|---|---|
| EP | 1 006 449 A2 | 6/2000 | | |
| JP | 09282263 A | * 10/1997 | ........... | G06F 13/14 |
| JP | A 2000-032005 | 1/2000 | | |
| JP | A 2000-032010 | 1/2000 | | |
| JP | 2000078156 A | * 3/2000 | ........... | H04L 12/28 |
| JP | A 2000-134229 | 5/2000 | | |
| JP | A 2000-172457 | 6/2000 | | |
| WO | WO 00/25215 | 5/2000 | | |
| WO | PCT/JP00/04639 | 3/2001 | | |

OTHER PUBLICATIONS

U.S. Appl. No. 09/737,760, filed Dec. 18, 2000, Matsunaga et al.

* cited by examiner

RAM (PACKET STORAGE MEANS)

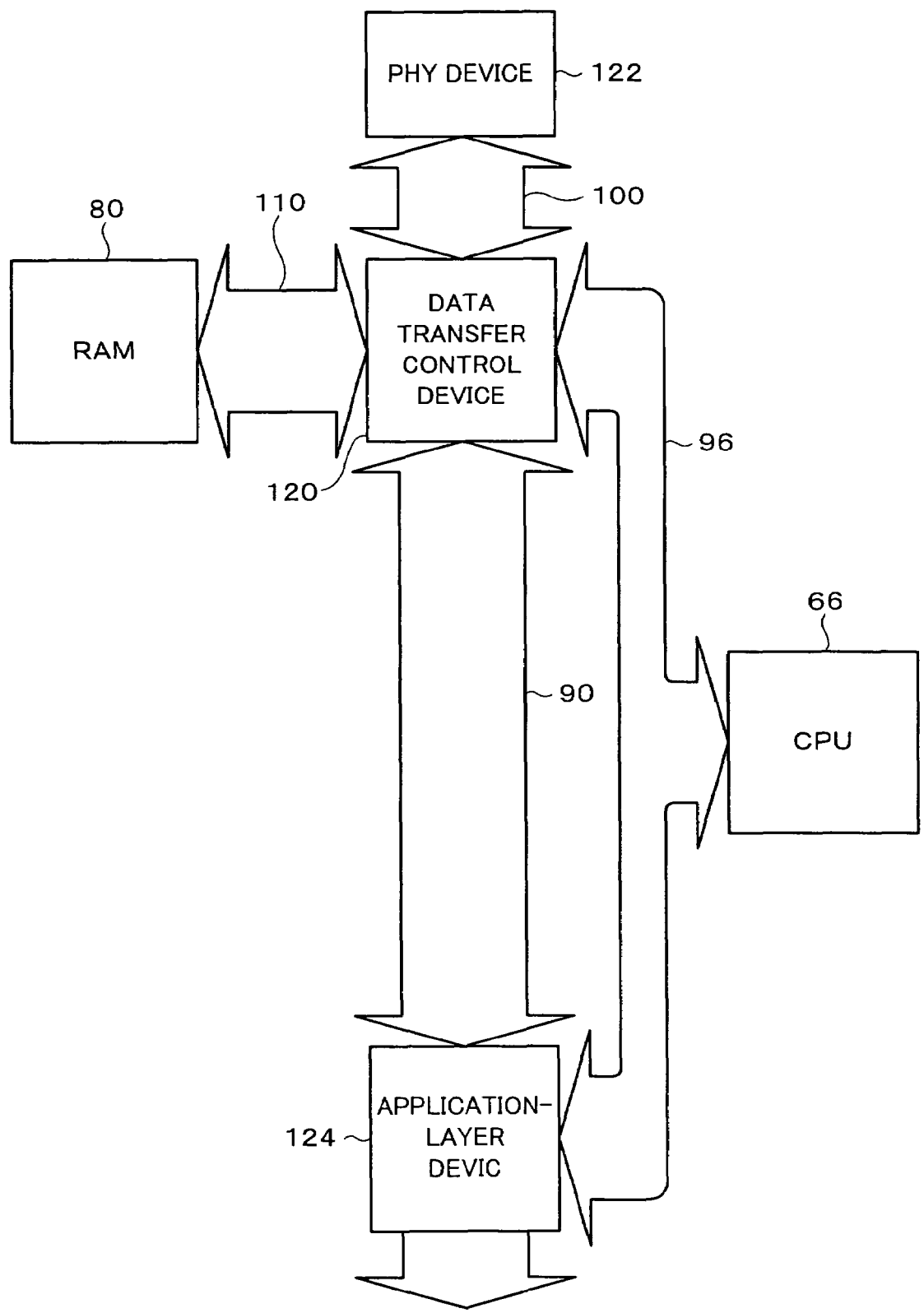

COMPARATIVE EXAMPLE

METHOD USING BUS RESET PACKET

METHOD USING BUS RESET POINTER

METHOD USING BUS RESET HEADER POINTER ALONE

METHOD USING BUS RESET ORB POINTER

FIG.21

| TAG(DTAG) | MEANING |
|---|---|
| 0001 | FW-SOP |
| 0010 | FW-HDR |
| 0011 | FW-FTR |
| 0100 | FW-ORB |
| 0101 | FW-STRM |
| 1001 | HW-SOP |
| 1010 | HW-HDR |
| 1011 | HW-FTR |
| 1100 | HW-ORB |
| 1101 | HW-STRM |

FW ······ FIRMWARE
HW ······ HARDWARE
SOP ······ START OF PACKET
         (INITIAL QUADLET OF RECEIVED PACKET)
HDR ······ HEADER OTHER THAN SOP
FTR ······ STATUS INFORMATION FOR THE TRANSMITTED PACKET
ORB ······ ORB (DATA)
STRM ······ STREAM (DATA)

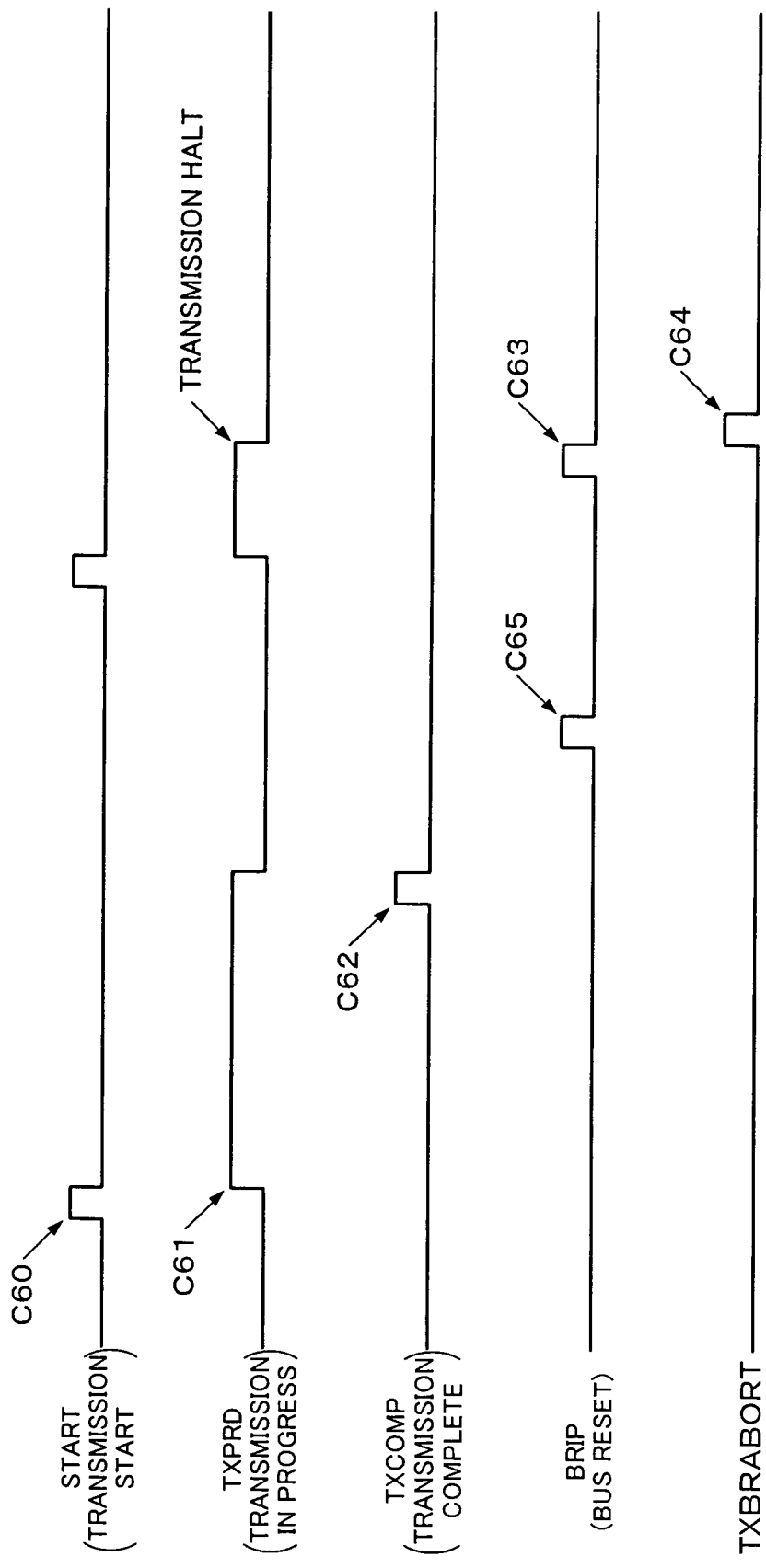

DATA TRANSFER CONTROL DEVICE AND ELECTRONIC EQUIPMENT FOR PERFORMING DATA

TECHNICAL FIELD

The present invention relates to a data transfer control device and electronic equipment, and, in particular, to a data transfer control device and electronic equipment for performing data transfer that is based on a standard such as IEEE 1394 between a plurality of nodes that are connected to a bus.

BACKGROUND ART

An interface standard called IEEE 1394 has recently been attracting much attention. This IEEE 1394 lays down standards for high-speed serial bus interfaces that can handle the next generation of multimedia devices. IEEE 1394 makes it possible is to handle data that is required to have real-time capabilities, such as moving images. A bus in accordance with IEEE 1394 can be connected not only to peripheral equipment for computers, such as printers, scanners, CD-RW drives, and hard disk drives, but also to domestic appliances such as video cameras, VTRs, and TVs. This standard is therefore expected to enable a dramatic acceleration of the digitalization of electronic equipment.

Under this IEEE 1394, an event called a bus reset occurs if new electronic equipment is connected to the bus, electronic equipment is removed from the bus, or the number of nodes connected to the bus increases. When a bus reset occurs, the topology information relating to the nodes is cleared then this topology information is automatically reset. In other words, after a bus reset, tree identification (determination of the root node) and self identification are performed, then the nodes that are to act as management nodes, such as the isochronous resource manager, are determined. Ordinary packet transfer then starts.

Since the topology information is automatically reset after a bus reset under this IEEE 1394, it is possible to insert and remove cables in a state called a hot state (hot-plugging). For that reason, this makes it possible for a user to freely plug in cables in the same manner as with ordinary domestic electrical appliances such as VTRs, which could be a useful factor in popularizing home network systems.

However, it has become clear that such a bus reset would cause problems, as described below.

(1) Since topology information such as node IDs is cleared by the occurrence of a bus reset, the occurrence of a bus reset during a transaction will make it necessary to re-do that transaction. It is therefore necessary for the nodes to determine which transactions are incomplete, when a bus reset occurs.

However, the processing capabilities of the firmware (CPU) that processes the packets is generally low, so that the processing of a received packet is done after a given period of time has elapsed after the reception of that packet. For that reason, there is always a large number of unprocessed packets and it is necessary to determine which of those many unprocessed packets were received before or after a bus reset. This processing places a very large load on the firmware. In particular, since an extremely large number of packets are transferred between the nodes after a bus reset, the number of packets received after a bus reset is also extremely large and thus the problem of the increased processing load on the firmware becomes more serious.

(2) If a bus reset occurs after the firmware has issued a packet transmission start command, that transmission is halted. If a bus reset occurs substantially simultaneously with the issue of a transmission start command, it will be impossible for the firmware to learn whether or not the transmission was halted by the occurrence of the bus reset. For that reason, there is a danger that the processing of the firmware will stall, with the firmware on standby until the transmission complete status comes in.

DISCLOSURE OF THE INVENTION

The present invention was devised in the light of the above described problems and has as an objective thereof the provision of a data transfer control device that makes it possible to reduce the processing load on firmware when a reset that clears node topology information occurs, making it possible to prevent problems such as stalling of the processing of the firmware caused by the occurrence of a reset, and electronic equipment using the same.

In order to solve the above described problems, a data transfer control device of the present invention which transfers data between a plurality of nodes connected to a bus, comprises: means which generates identification information for determining whether or not one received packet and the next received packet are received during different reset intervals, when a reset interval is defined as the period between a reset that clears node topology information and the next reset; and write means which links each received packet with the generated identification information, and writing the linked packet and identification information into a packet storage means.

This aspect of the present invention makes it possible to determine whether or not Nth and (N+1)th packets were received in different reset intervals, for example, by Nth identification information linked to the received Nth packet and (N+1)th identification information linked to the (N+1)th packet that was received next. In other words, if the Nth and (N+1)th packets were received within the same Mth reset interval, the Nth and (N+1)th identification information would have the same value, by way of example, but if the Nth and (N+1)th packets were received within Mth and Lth reset intervals that are different, the Nth and (N+1)th identification information would have different values. It is therefore possible to determine whether or not the Nth and (N+1)th packets were received within different reset intervals, in other words, whether or not a reset occurred between the receptions of the Nth and (N+1)th packets, by checking for a change in the Nth and (N+1)th identification information. The firmware or the like can therefore learn the time at which the reset occurred in a simple manner, thus enabling a reduction in the processing load during the reset occurrence.

The identification information may be a toggle bit that toggles from zero to one or from one to zero when one received packet and the next received packet are packets received within different reset intervals. This makes it possible to learn the time at which a reset occurred in a simple manner, by simply checking for any change in the toggle bit, further reducing the processing load on the firmware during a reset.

When the packet storage means is a randomly accessible storage means and is divided into a control information area in which is stored packet control information and a data area in which is stored packet data, the identification information may be included within the control information written to the control information area. This makes it possible to reduce the processing load on the firmware or the like by dividing the packet storage means into a control information area and a data area, enabling an increase in the actual transfer speed of the entire system. By comprising the identification information within control information that is written to the control information area, it becomes possible for the firmware or the like to simply read the identification information with a low processing load.

A data transfer control device of the present invention which transfers data between a plurality of nodes connected to a bus, comprises: write means which writes packet that have been received from each node into a packet storage means; and first pointer storage means which stores first pointer information that specifies a boundary in the packet storage means between an area for a packet received before the occurrence of a reset that clears node topology information and an area for a packet received after the occurrence of the reset.

The present invention makes it possible for the firmware to distinguish between a packet received before the occurrence of a reset and a packet received after the occurrence of the reset in a simple manner, just by reading the first pointer information from the first pointer storage means. This also makes it possible to perform various different types of processing, such as destruction of a packet received before the occurrence of the reset and usual processing of a packet received after the occurrence of the reset.

A start address of the next packet after a packet that was received immediately before the occurrence of a reset may be stored as the first pointer information in the first pointer storage means. This configuration makes it possible to start the processing of the next packet after a packet that was received immediately before the occurrence of a reset, just by reading the first pointer information from the first pointer storage means, thus reducing the processing load on the firmware or the like.

The data transfer control device of the present invention may further comprise: a second pointer storage means for storing second pointer information which specifies a boundary in the packet storage means between an area for processed packets and an area for unprocessed packets; and a third pointer storage means for storing third pointer information which specifies a boundary in the packet storage means between an area for received packets and an area storing no received packets. This configuration makes it possible to distinguish between unprocessed packets and the most recently received packet in a simple manner, by just reading the second and third pointer information from the second and third pointer storage means.

The data transfer control device of the present invention may further comprise processing means which specifies a packet received after the occurrence of the reset, based on the first pointer information stored in the first pointer storage means, and gives priority to processing the specified packet. This configuration makes it possible to avoid situations such as one in which the firmware processing stalls, by enabling preferential processing of a packet received after the reset has occurred.

When the packet storage means is a randomly accessible storage means and is divided into a control information area in which is stored packet control information and a data area in which is stored packet data, the first pointer storage means may include: a fourth pointer storage means for storing fourth pointer information which specifies a boundary in the control information area between control information for a packet received before the occurrence of the reset that clears node topology information and control information for a packet received after the occurrence of the reset; and a fifth pointer storage means for storing fifth pointer information which specifies a boundary in the data area between data of a packet received before the occurrence of the reset that clears node topology information and data of a packet received after the occurrence of the reset. This configuration makes it possible to determine the boundary in the data area between packets received before and after the occurrence of a reset, by simply reading the fifth pointer information from the fifth pointer storage means, enabling an even further reduction in the processing load on the firmware or the like.

When the data area has been divided into a first data area for storing first data for a first layer and a second data area for storing second data for a second layer, the fifth pointer information may be pointer information which specifies a boundary in the first data area between the first data for a packet received before the occurrence of a reset that clears node topology information and the first data for a packet received after the occurrence of the reset. This configuration makes it possible to reduce the processing load on a first layer (such as firmware), by enabling the first layer to read first data stored in a first data area (such as ORBs) and thus distinguish between before and after a reset. The actual transfer speed of the data transfer control device can be improved by enabling a second layer (such as an application) to read out second data stored in a second data area (such as stream data) continuously.

A data transfer control device of the present invention which transfers data between a plurality of nodes connected to a bus, comprises: read means which reads a packet from a packet storage means when a transmission start command has been issued; link means which provides services for transmitting read packet to each node; and status storage means which stores status information indicating that the transmission of a packet has been halted, when the transmission of the packet has been halted by the occurrence of a reset that clears node topology information.

This aspect of the invention makes it possible for the firmware or the like to determine whether packet transmission has been halted by the occurrence of a reset, by reading status information from the status storage means. As a result, it is possible to prevent a situation in which the processing of the firmware or the like stalls, even if a reset occurs slightly before the issue of a transmission start command, by way of example.

The data transfer control device may further comprise processing means which issues the transmission start command, and the processing means may cancel transmission processing that has already started, without determining whether or not transmission has been completed, when it has been determined from the status information that transmission of a packet has been halted by the occurrence of the reset. This configuration makes it possible to prevent a situation in which the processing of the firmware stalls, without making it necessary for the firmware to wait for the transmission complete status to arrive.

In the present invention, the reset may be a bus reset as defined by the IEEE 1394 standard.

In the present invention, data transfer may be in accordance with the IEEE 1394 standard.

Electronic equipment in accordance with the present invention comprises: any one of the above-described data transfer control devices; a device which performs given processing on data that has been received from another node through the data transfer control device and a bus; and a device which outputs or stores data that has been subjected to processing. Alternatively, electronic equipment in accordance with the present invention comprises: any one of the above described data transfer control devices; a device which performs given processing on data that is to be transferred to another node through the data transfer control device and a bus; and a device which takes in data to be subjected to processing.

According to the present invention, since processing load on the firmware or the like which controls data transfer is reduced, electronic equipment can be made less expensive but with higher processing speeds. Since it is possible to avoid a situation in which the system is stalled by the occurrence of a reset that clears topology information, the reliability of the electronic equipment can also be increased.

BRIEF DESCRIPTION OF DRAWINGS

FIG. 8 is illustrative of the method of data transfer of this embodiment of the present invention.

FIG. 21 is illustrative of TAG.

FIG. 26 is a timing waveform chart that is illustrative of details of the bus reset transmission halt status.

BEST MODE FOR CARRYING OUT THE INVENTION

Detailed embodiments of this invention are described below with reference to the accompanying drawings.

1. IEEE 1394

The description first relates to an outline of IEEE 1394.

1.1 Outline

The IEEE 1394 standard (IEEE 1394-1995, P1394.a) enables high-speed data transfer at 100 to 400 Mbps (P1394.b concerns 800 to 3,200 bps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

IEEE 1394 provides for asynchronous transfer and isochronous transfer as packet transfer methods. In this case, asynchronous transfer is suitable for data transfers where reliability is required and isochronous transfer is suitable for transfers of data such as moving images and audio, where real-time capabilities are required.

1.2 Layer Structure

Figure 1:
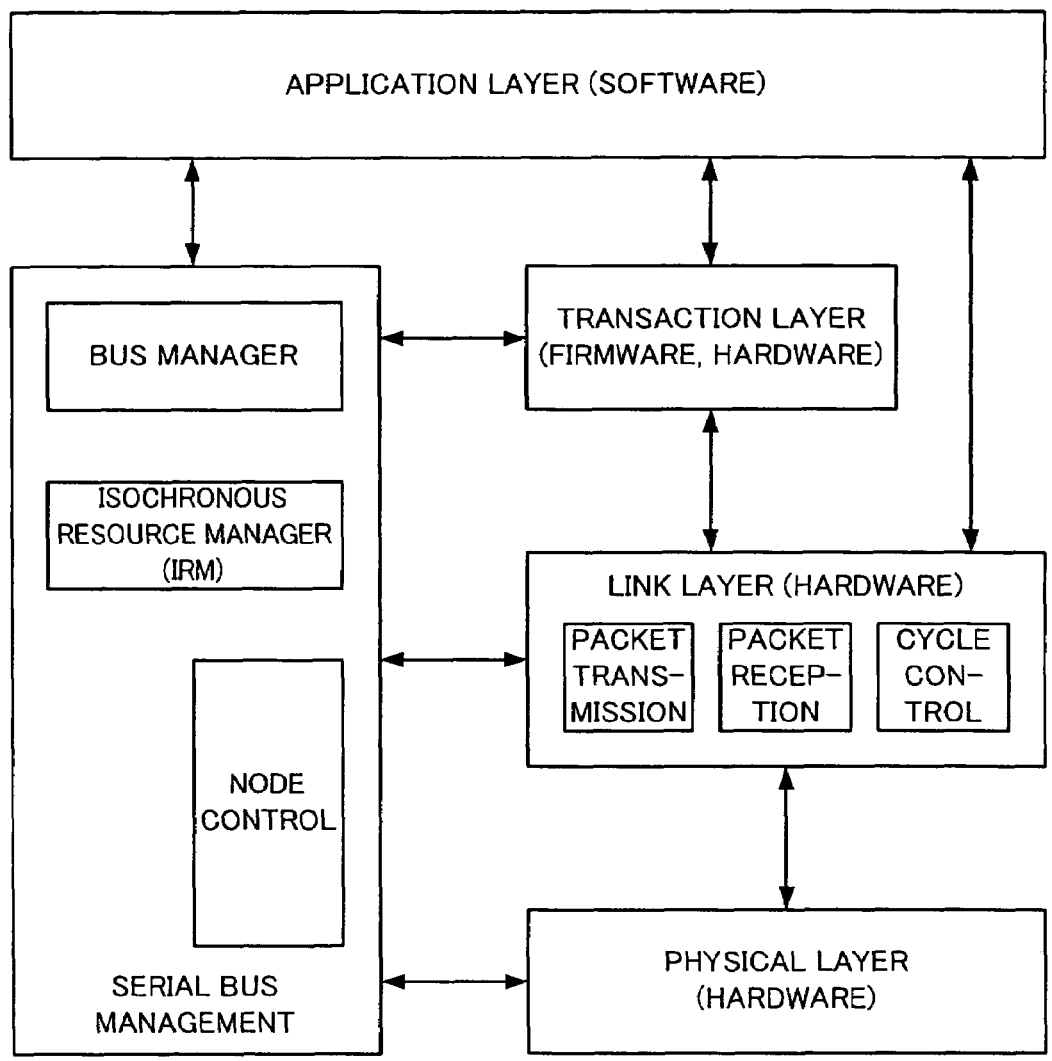
FIG. 1 shows the layer structure of IEEE 1394.

The layer structure (protocol structure) covered by IEEE 1394 is shown in FIG. 1.

The IEEE 1394 protocol is configured of a transaction layer, a link layer, and a physical layer. A serial bus management function monitors and controls the transaction layer, link layer, and physical layer, and provides various functions for controlling nodes and managing bus resources.

The transaction layer provides an interface (service) for transaction units within upper layers and a link layer for lower layers, and executes transactions such as read transactions, write transactions, and lock transactions.

In this case, a read transaction causes data to be transmitted from the responding node to the node that requested the data. Similarly, a write transaction causes data to be transmitted from the requesting node to the responding node. A lock transaction causes data to be transmitted from the requesting node to the responding node, and the responding node then processes that data and returns it to the requesting node.

Figure 2A:
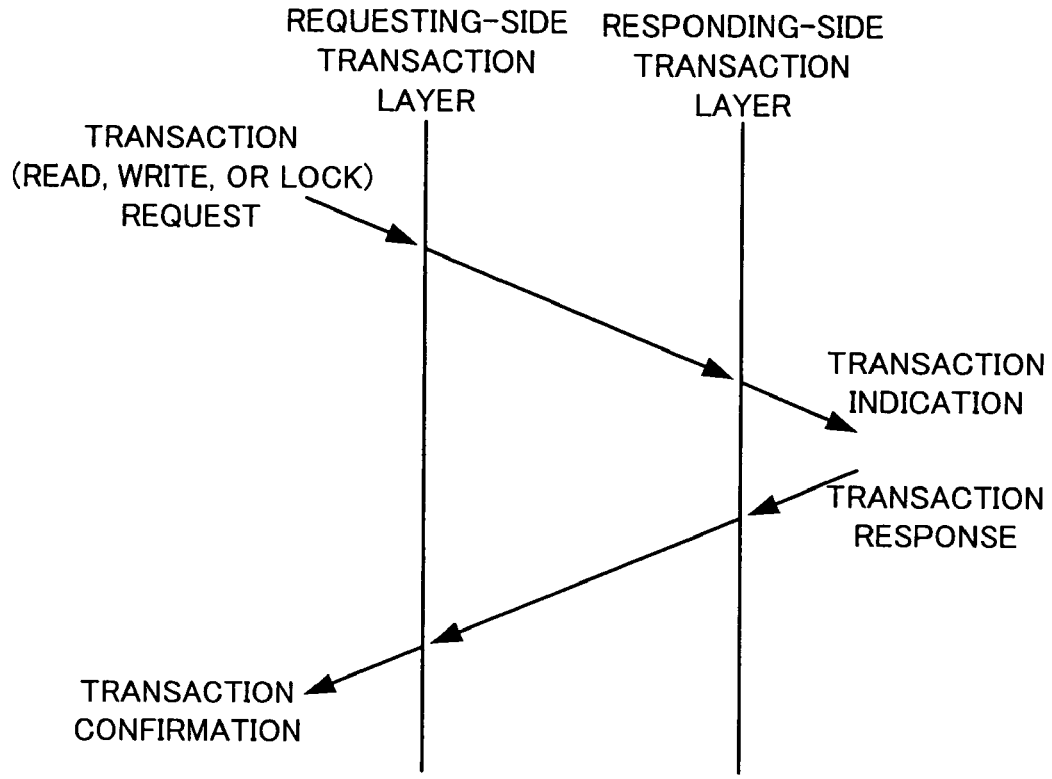
FIGS. 2A and 2B are illustrative of the various services provided by the transaction layer and the link layer.

The services provided by the transaction layer are configured of four services (request, indication, response, and confirmation), as shown in FIG. 2A.

In this case, a transaction request is a service that causes the requesting side to start a transaction, and a transaction indication is a service that informs the responding side that a request has been reported. A transaction response is a service that returns the state or data of the responding side to the requesting side, and a transaction confirmation is a service that informs the requesting side that a response has arrived from the responding side.

The link layer provides functions such as addressing, data check, data framing for packet transmission/reception, and cycle control for isochronous transfer.

Figure 2B:
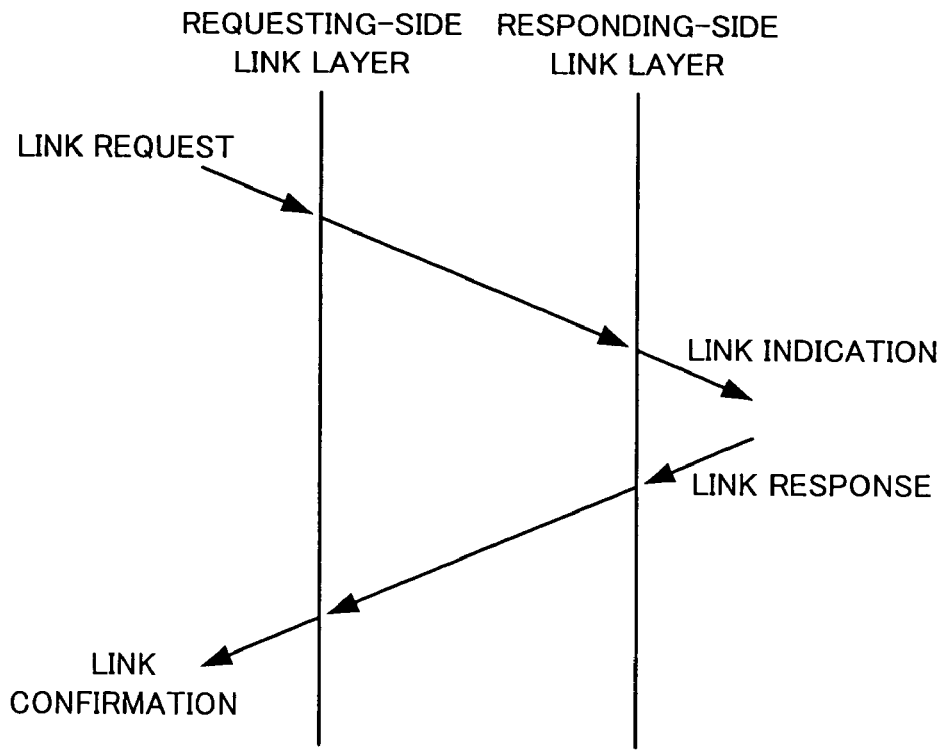

The services provided by the link layer are configured of four services (request, indication, response, and confirmation), as shown in FIG. 2B.

In this case, a link request is a service that transfers a packet to the responding side and a link indication is a service that receives a packet from the responding side. A link response is a service that transfers an acknowledgment from the responding side and a link confirmation is a service that receives an acknowledgment from the requesting side.

The physical layer converts the logical symbols used by the link layer into electrical signals, performs bus arbitration, and defines the physical bus interface.

The physical layer and link layer are usually implemented by hardware such as a data transfer control device (interface chip). The transaction layer is implemented either by firmware (processing means) operating on the CPU, or hardware.

Figure 3:
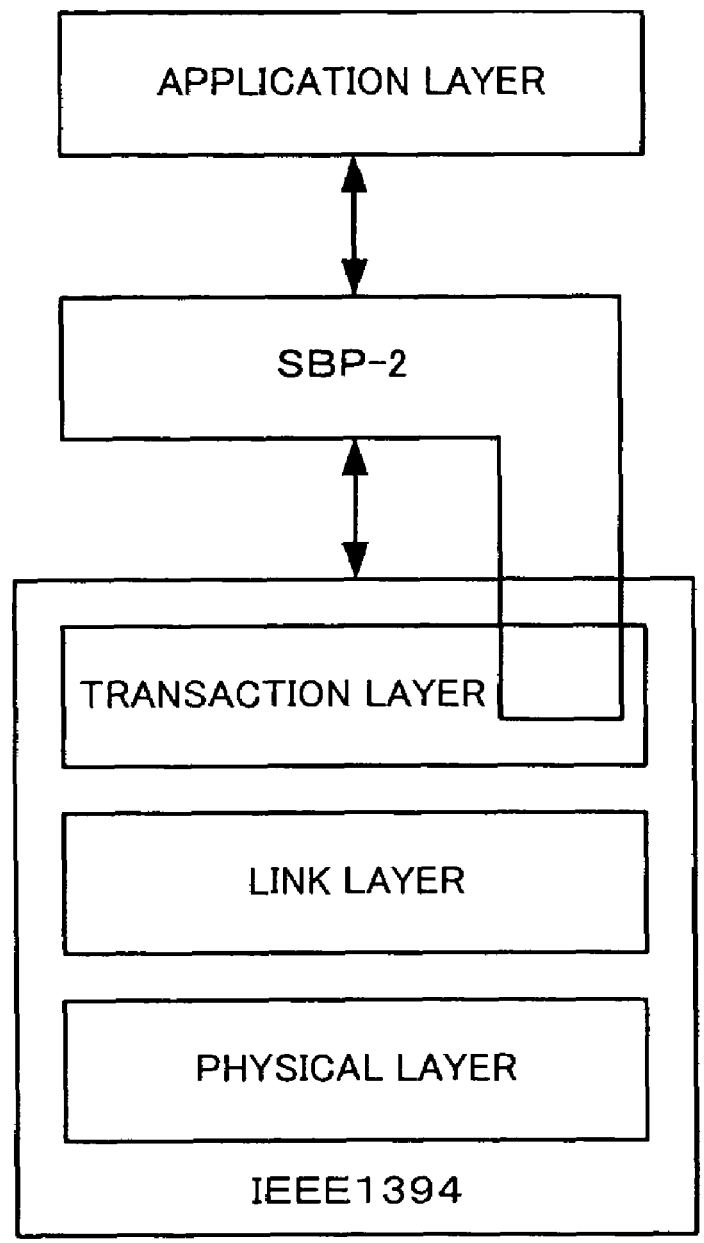
FIG. 3 is illustrative of the SBP-2.

Note that a protocol called the serial bus protocol 2 (SBP-2) has been proposed as a higher-order protocol that comprises some of the functions of the transaction layer under IEEE 1394, as shown in FIG. 3.

In this case, SBP-2 is proposed in order to enable utilization of the SCSI command set on top of the IEEE 1394 protocol. Use of this SBP-2 minimizes the changes to be made to the SCSI command set that is used in electronic equipment that conforms to the existing SCSI standards, and also enables their use in electronic equipment that conforms to the IEEE 1394 standard. The design and development of electronic equipment can be simplified thereby. Since it is also possible to encapsulate device-specific commands, not just SCSI commands, this greatly increases the universality of the command set.

With SBP-2, log-in processing is done by first using an operation request block (ORB) for initializing a log-in or fetch agent, which is created by an initiator (such as a personal computer). The initiator then creates an ORB (command block ORB) comprising a command (such as a read command and write command), then informs the target of the address of the thus created ORB. The target acquires the ORB created by the initiator by fetching from that address. If the command within the ORB was a read command, the target executes a block write transaction to transmit data from the target to the data buffer (memory) of the initiator. If the command within the ORB was a write command, on the other hand, the target executes a block read transaction to receive data from the data buffer of the initiator.

With this SBP-2, the target can execute a transaction to send or receive data when its own circumstances allow since it is therefore not necessary for the initiator and the target to operate in synchronism, the efficiency of data transfer can be increased.

Note that protocols other than SBP-2 are also being proposed as protocols of a higher order than IEEE 1394, such as the function control protocol (FCP).

1.3 Bus Reset

Under the IEEE 1394, a bus reset occurs when power is applied or devices have been disconnected or connected while power is on. In other words, each node monitors the voltage state at the corresponding port. If a voltage change occurs at a port because of the connection of a new node to the bus, for example, a node that has detected that change informs the other nodes on the bus that a bus reset has occurred. The physical layer of each node informs the link layer that a bus reset has occurred.

When such a bus reset occurs, topology information such as node IDs is cleared, then this topology information is automatically reset. In other words, tree identification and self identification are performed after a bus reset. The nodes that are to act as management nodes, such as the isochronous resource manager, cycle master, and bus manager are then determined. Ordinary packet transfer starts.

Since the topology information is automatically reset after a bus reset under this IEEE 1394, it is possible to implement a hot-plug configuration in which the cables of electronic equipment can be freely removed or inserted.

Note that if a bus reset occurs during a transaction, that transaction is cancelled. The requesting node that issued the canceled transaction transfers the request packet again, after the topology information has been reset. The responding node does not return a response packet to the requesting node for a transaction that has been canceled by a bus reset.

2. Overall Configuration

The overall configuration of the data transfer control device in accordance with this embodiment of the invention is described below, with reference to FIG. 4.

Figure 4:
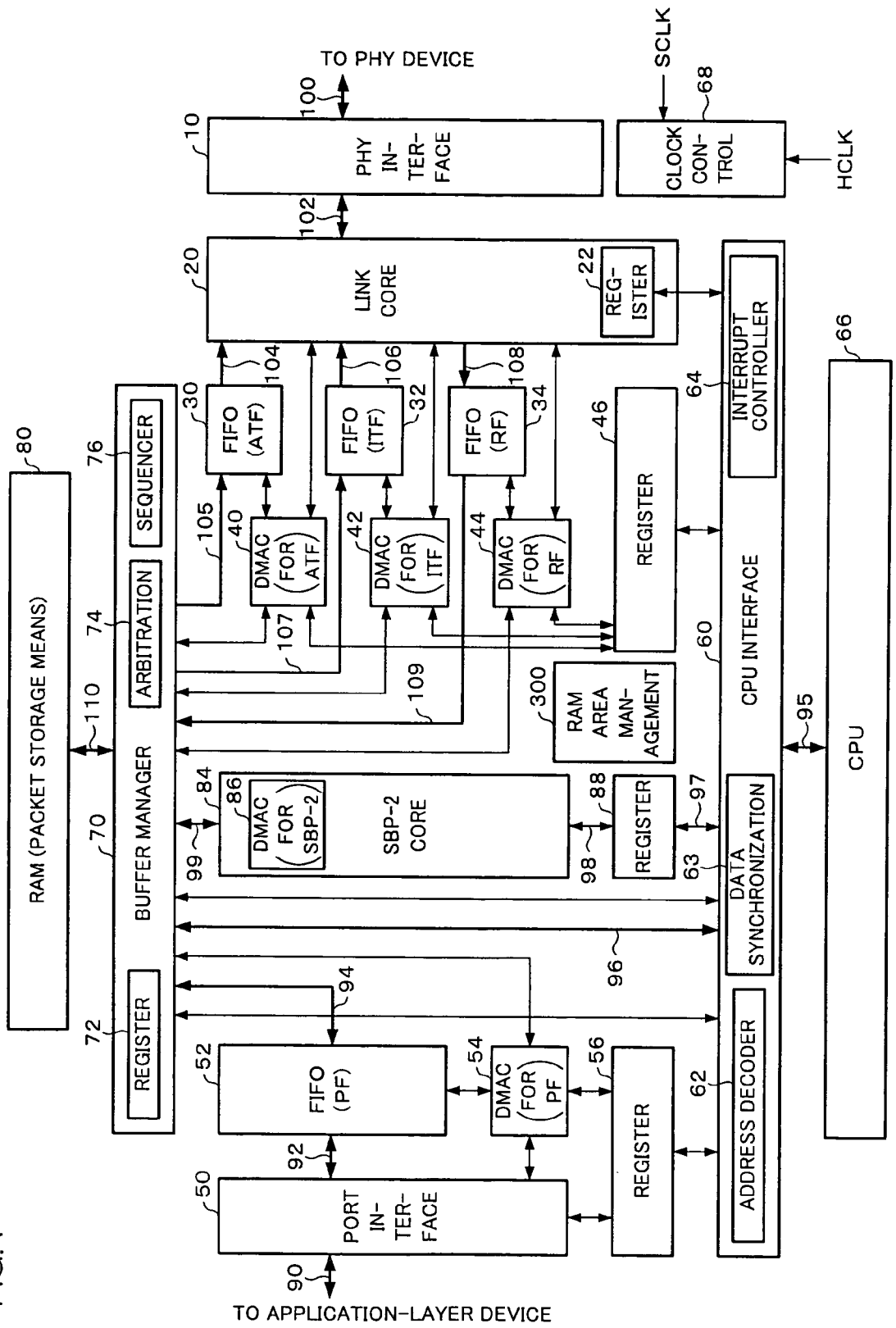
FIG. 4 shows an example of the configuration of a data transfer control device in accordance with an embodiment of this invention.

In FIG. 4, a PHY interface 10 is a circuit that provides an interface with a PHY device (a physical-layer device).

A link core 20 (link means) is a circuit implemented in hardware that provides part of the link layer protocol and the transaction layer protocol; it provides various services relating to packet transfer between nodes. A register 22 is provided for controlling the link core 20 that implements these protocols.

A FIFO (ATF) 30, FIFO (ITF) 32, and FIFO (RF) 34 are FIFOs for asynchronous transmission, isochronous transmission, and reception, respectively: each being configured of hardware means such as registers or semiconductor memory. In this embodiment of the invention, these FIFOs 30, 32, and 34 have an extremely small number of stages. For example, the number of stages per FIFO can be no more than three, or no more than two.

A DMAC 40 (read means), a DMAC 42 (read means), and a DMAC 44 (write means) are DMA controllers for ATF, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with an application-layer device (such as a device for performing print processing for a printer, by way of example). In this embodiment of the invention, the use of this port interface 50 makes it possible to transfer 8-bit data, for example.

A FIFO (PF) 52 is a FIFO used for transferring data between an application-layer device and a DMAC 54 is a DMA controller for PF. A register 56 provides control over the port interface 50 and the DMAC 54.

An SBP-2 core 84 is a circuit that implements part of the SBP-2 protocol by hardware. A register 88 provides control over the SBP-2 core 84. A DMAC (for SBP-2) 86 is a DNA controller for the SBP-2 core 84.

A RAM area management circuit 300 is a circuit for managing the various areas within the RAM 80. When each of the areas within the RAM 80 becomes full or empty, the RAM area management circuit 300 uses various full or empty signals to control the DMACs 40, 42, 44, 54, and 86.

A CPU interface 60 provides an interface with the CPU 66 that controls the data transfer control device. The CPU interface 60 comprises an address decoder 62, a data synchronization circuit 63, and an interrupt controller 64. A clock control circuit 68 controls the clock signals used by this embodiment, and SCLK that is sent from the PHY device (PHY chip) and HCLK, which is the master clock, are input thereto.

A buffer manager 70 is a circuit that manages the interface with the RAM 80. The buffer manager 70 comprises a register 72 for controlling the buffer manager, an arbitration circuit 74 that arbitrates the bus connection to the RAM 80, and a sequencer 76 that generates various control signals.

The RAM 80 functions as a randomly accessible packet storage means, where this function is implemented by SRAM, SDRAM, or DRAM or the like.

Note that the RAM 80 may be accommodated within the data transfer control device of this embodiment of the invention, but it is possible to attach part or all of the RAM 80 externally.

Figure 5:
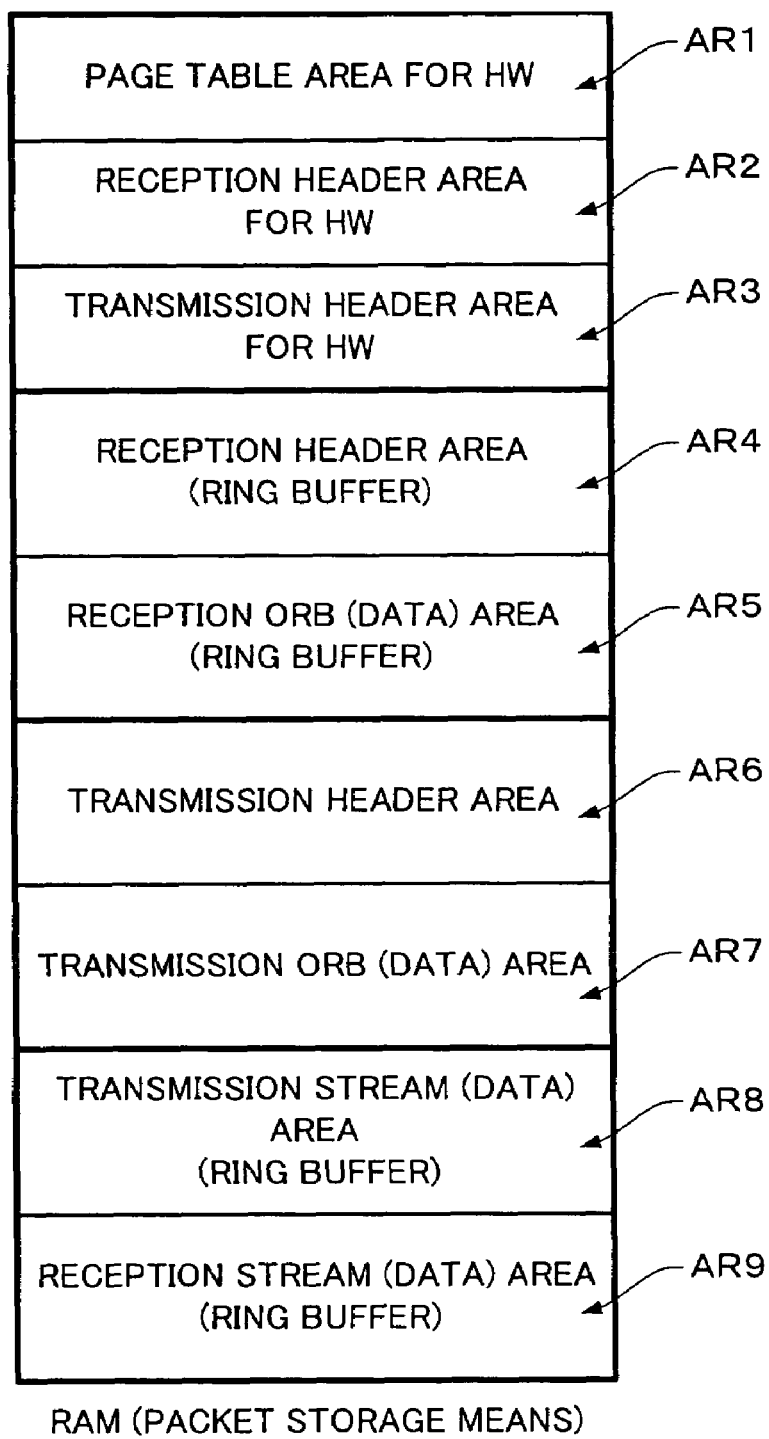
FIG. 5 is illustrative of a technique of separating (dividing) within a RAM (packet storage means).

An example of the memory map of the RAM 80 is shown in FIG. 5. In this embodiment of the invention as shown in FIG. 5, the RAM 80 is divided into header areas (AR2, AR3, AR4, and AR6) and data areas (AR5, AR7, AR8, and AR9). The header of a packet (broadly speaking, control information) is stored in a header area and the data (ORB and stream) is stored in a data area.

In this embodiment of the invention, the data areas (AR5, AR7, AR8, and AR9) in the RAM 80 are divided into ORB areas (AR5 and AR7) and stream areas (AR8 and AR9), as shown in FIG. 5.

In addition, the RAM 80 in this embodiment is divided into reception areas (AR2, AR4, AR5, and AR9) and transmission areas (AR3, AR6, AR7, and AR8).

Note that each ORB (first data for a first layer) is data (commands) conforming to SBP-2 as described above. A stream (second data for a second layer that is above the first layer) is data for the application layer (such as print data for a printer, read or write data for a CD-RW, or image data that has been fetched by a scanner).

A page table area for hardware (HW), a reception header area for HW, and a transmission header area for HW, denoted by AR1, AR2, and AR3, are areas used by the SBP-2 core 84 of FIG. 4 for writing and reading the page table, reception header, and transmission header.

Note that the areas denoted by AR4, AR5, AR8, and AR9 in FIG. 5 form a structure called a ring buffer.

A bus 90 (or buses 92 and 94) shown in FIG. 4 is for connections to applications (a first bus). Another bus 95 (or bus 96), which is for controlling the data transfer control device, is connected electrically to a device (such as a CPU) that controls the data transfer control device as a second bus. Yet another bus 100 (or buses 102, 104, 105, 106, 107, 108, and 109) is for electrical connections to physical-layer devices (such as a PHY device), as a third bus. A further bus 110 (a fourth bus) is for electrical connections to RAM that acts as a randomly accessible storage means. A still further bus 99 (a fifth bus) is for reading and writing header information and page table information, to enable the SBP-2 core 84 to implement SBP-2 by hardware.

The arbitration circuit 74 in the buffer manager 70 arbitrates bus access requests from the DMACs 40, 42, and 44, the CPU interface 60, and the DMACs 86 and 54. Based on the results of this arbitration, a data path is established between one of the buses 105, 107, 109, 96, 99, and 94 and the bus 110 of the RAM 80 (i.e., a data path is established between one of the first, second, third, and fifth buses and the fourth bus).

One feature of this embodiment of the present invention is the way in which it is provided with the RAM 80, which stores packets in a randomly accessible manner, and also the mutually independent buses 90, 96, 99, and 100 as well as the arbitration circuit 74 for connecting one of those buses to the bus 110 of the RAM 80.

Figure 6:
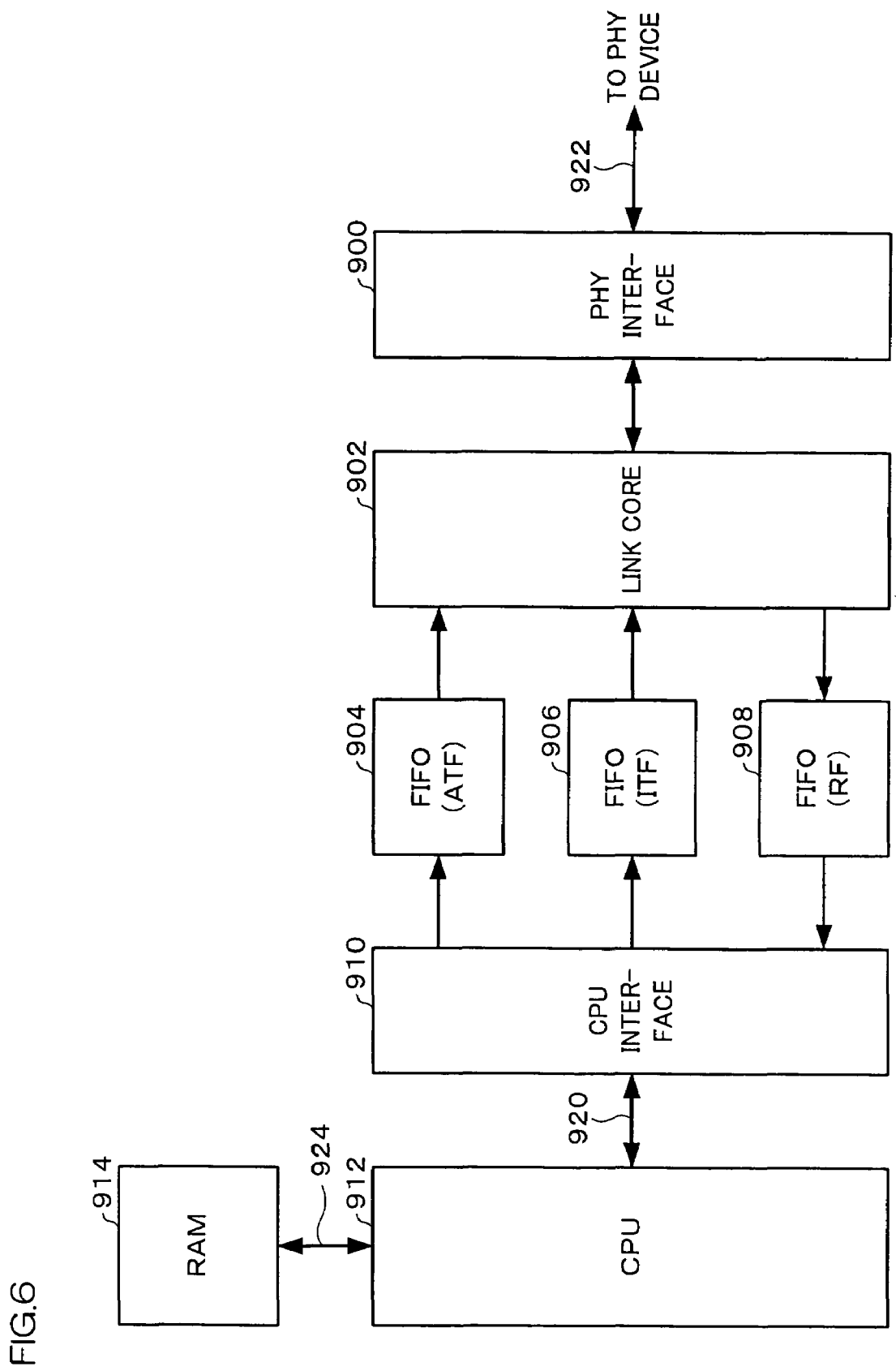
FIG. 6 shows the configuration of a comparative example.

A data transfer control device that has a different configuration from that of this embodiment is shown in FIG. 6, by way of example. In this data transfer control device, a link core 902 is connected to a PHY device by a PHY interface 900 and a bus 922. The link core 902 is connected to a CPU 912 by FIFOs 904, 906, and 908, a CPU interface 910, and a bus 920. The CPU 912 is also connected to a RAM 914, which is local memory in the CPU, by a bus 924.

The method of data transfer used with the data transfer control device configured as shown in FIG. 6 will now be described with reference to FIG. 7. A received packet sent from another node through a PRY device 930 passes through the bus 922, a data transfer control device 932, and the bus 920, then is accepted by the CPU 912. The CPU 912 temporarily writes the accepted received packet to the RAM 914 over the bus 924. The 912 then reads the received packet that has been written to the RAM 914 over the bus 924, processes the received packet into a form that can be used by the application layer, then transfers it to an application-layer device 934 over a bus 926.

When the application-layer device 934 transfers data, on the other hand, the CPU 912 writes this data to the RAM 914. A header is attached to the data in the RAM 914 to create a packet that conforms to IEEE 1394. The thus created packet is sent to another node over the path comprising the data transfer control device 932 and the PHY device 930.

Figure 7:
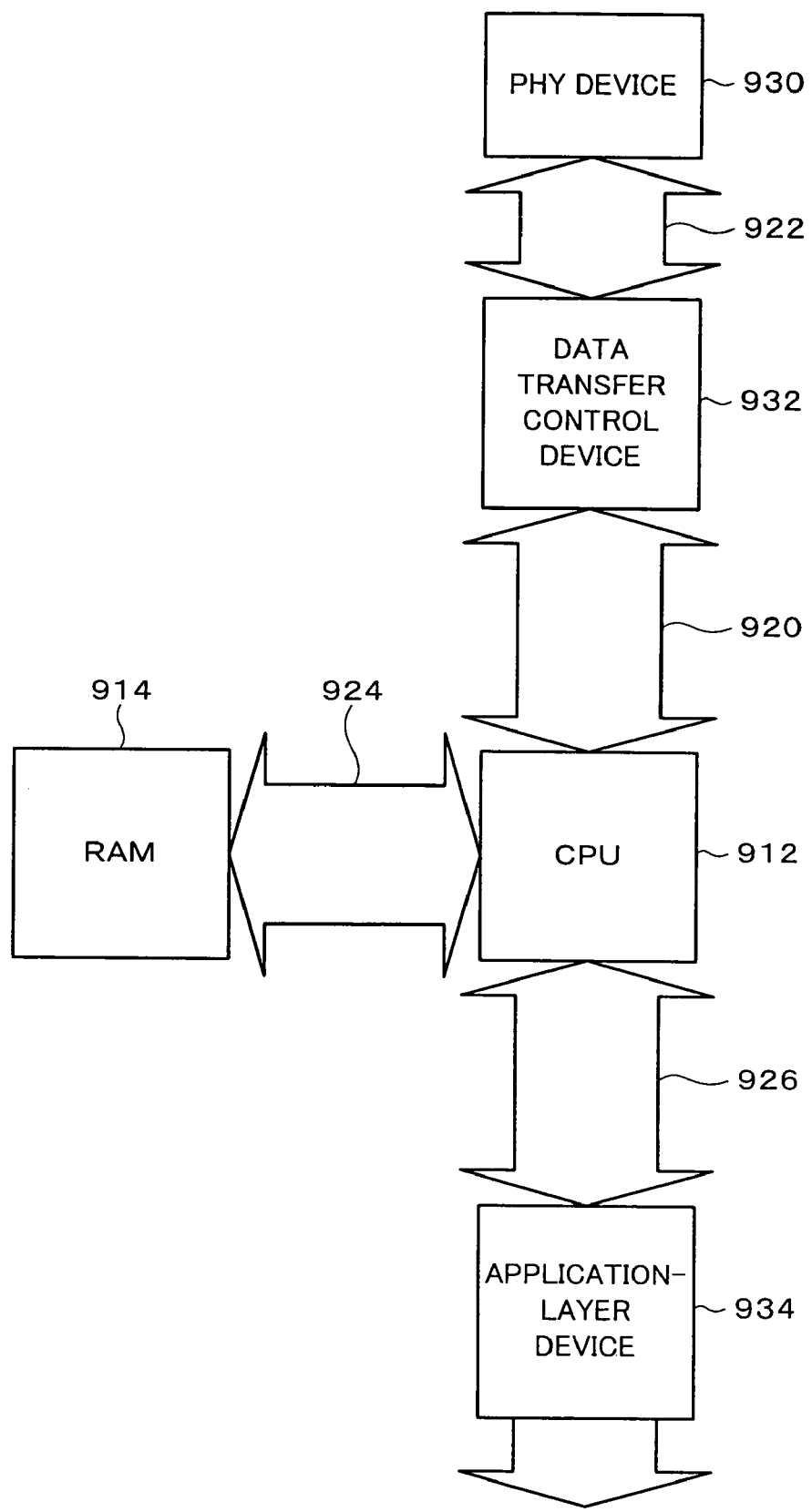
FIG. 7 is illustrative of the method of data transfer implemented by the configuration of FIG. 6.

However, if the data transfer method of FIG. 7 is employed, the processing load on the CPU 912 is extremely heavy. This means that, even if there is a fast transfer speed over the serial bus that connects nodes, the actual transfer speed of the entire system is slowed by factors such as processing overheads of the CPU 912, so that it is ultimately not possible to implement high-speed data transfer.

In contrast thereto, this embodiment of the invention ensures that the bus 90 between a data transfer control device 120 and an application-layer device 124; the CPU bus 96; and the bus 110 between the data transfer control device 120 and the RAM 80 are mutually separated, as shown in FIG. 8. The configuration is therefore such that the CPU bus 96 can be used solely for controlling data transfer. The bus 90 is also dedicated so that it can be used for data transfer between the data transfer control device 120 and the application-layer device 124. If, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Features of this Embodiment 3.1 Bit Toggled by Bus Reset

Figure 9A:
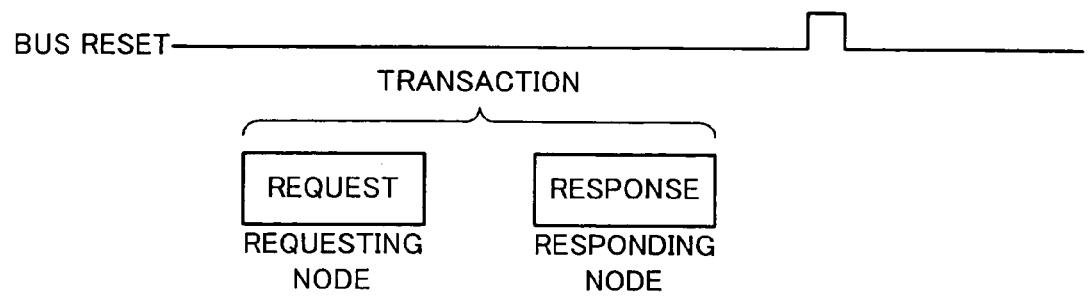
FIGS. 9A and 9B are illustrative of the halting of a transaction by the occurrence of a bus reset.

An IEEE 1394 transaction is completed by the requesting node transmitting a request packet to the responding node and the requesting node receiving the corresponding response packet from the responding node, as shown in FIG. 9A. There is no problem if a bus reset occurs after such a transaction completion.

Figure 9B:
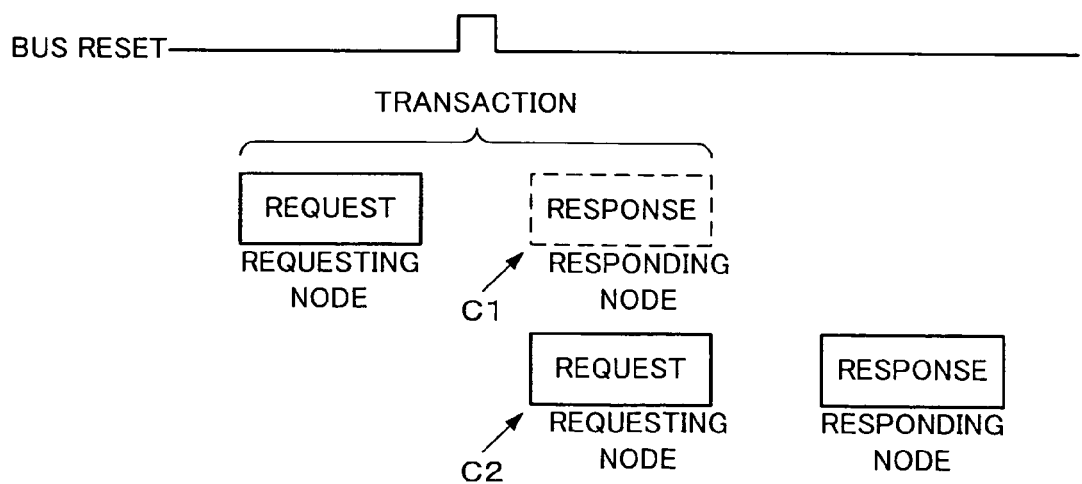

If a bus reset occurs during a transaction, on the other hand, the transaction halts as shown at C1 in FIG. 9B. In such a case, the responding node cannot return the response packet for the halted transaction back to the requesting node. Since the transaction has been completed, the requesting node must send the request packet again to the responding node, as shown at C2.

If the data transfer control device of this embodiment of the present invention is incorporated into peripheral equipment such as a printer or CD-RW drive, however, it is usual to use an inexpensive CPU having low processing capabilities as the CPU 66 of FIG. 4, from the point of view of controlling production costs. The processing capabilities of the firmware operating on the CPU 66 are therefore also low. This means that received packets cannot be processed as soon as they are received, so that a large number of unprocessed received packets exist in the RAM 80. If a bus reset occurs, it is therefore necessary to perform processing to determine whether these unprocessed packets were received either before or after the bus reset. In other words, it is necessary to perform processing to detect the time at which the bus reset occurred. Since the processing capabilities are generally considered to be low, as described previously, the processing for detecting the time at which a bus reset occurred is preferably such as to reduce the load thereon.

This embodiment of the present invention uses the method described with reference to FIG. 10.

In other words, a bus reset interval is defined as the interval between one bus reset (a reset that clears node information) and the next bus reset. As shown by way of example in FIG. 10, the interval between bus resets M and M+1 is a bus reset interval M and the interval between bus resets M+1 and M+2 is a bus reset interval M+1.

In this case, this embodiment of the invention generates a toggle bit BT (broadly speaking, identification information) for determining whether or not one received packet and the next received packet were received in different reset intervals. The configuration is such that this toggle bit BT is linked to each packet and is written to RAM (the packet storage means) as shown at C11 in FIG. 10.

Figure 10:
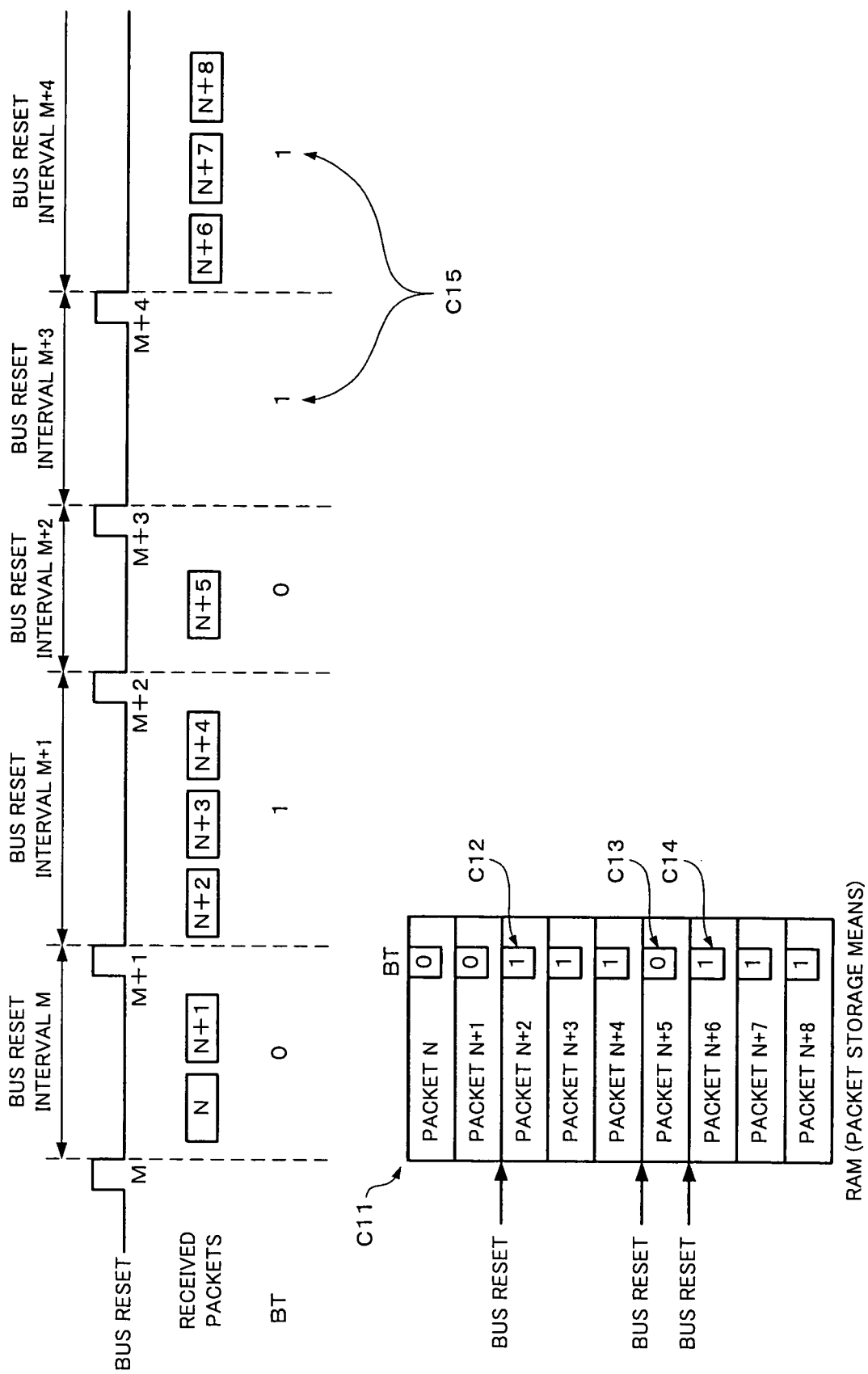
FIG. 10 is illustrative of the toggle bit BT.

In other words, packets N and N+1 were received in the same bus reset period M of FIG. 10, so the BT is zero for both. Since packets N+1 and N+2 were received in different bus reset intervals M and M+1, the BT for packet N+1 is zero whereas the BT for packet N#2 is 1. In other words, the BT toggles between zero and one. Similarly, packets N+4 and N+5 were received in bus reset intervals M+1 and M+2, so the BT toggles from one to zero. Packets N+5 and N+6 were received during bus reset intervals M+2 and M+4, so the BT toggles from zero to one.

As is clear from C12, C13, and C14 of FIG. 10, therefore, the configuration is such that the time at which BT has toggled correspond to the time at which bus resets occurred (boundaries in RAM). For that reason, the firmware (processing means) can learn the time at which bus resets occurred by simply checking the time at which BT toggled. As a result, the firmware can perform processing to process packets N+6, N+7, and N+8 (which were received after the last bus reset, by way of example) in the usual manner, and processing to destroy packets N to N+5 that were received before the last bus reset occurred.

This embodiment of the present invention is particularly characterized in the way in which BT does not change at C15 in FIG. 10. In other words, if BT were to be set to toggle every time a bus reset occurs, it would toggle from one to zero at C15 because bus reset M+4 occurs then. If that were to happen, BET would change from zero to one at C14 in FIG. 10, regardless of the fact that packets N+5 and N+6 are received in different bus reset intervals. As a result, a problem will occur in that the firmware would not be able to detect the occurrence of the bus reset between the receptions of the packets N+5 and N+6.

This problem does not occur in this embodiment of the present invention because it is configured in such a manner that BT toggles from zero to one or from one to zero on condition that sequentially received packets were received in different reset intervals.

Figure 11:
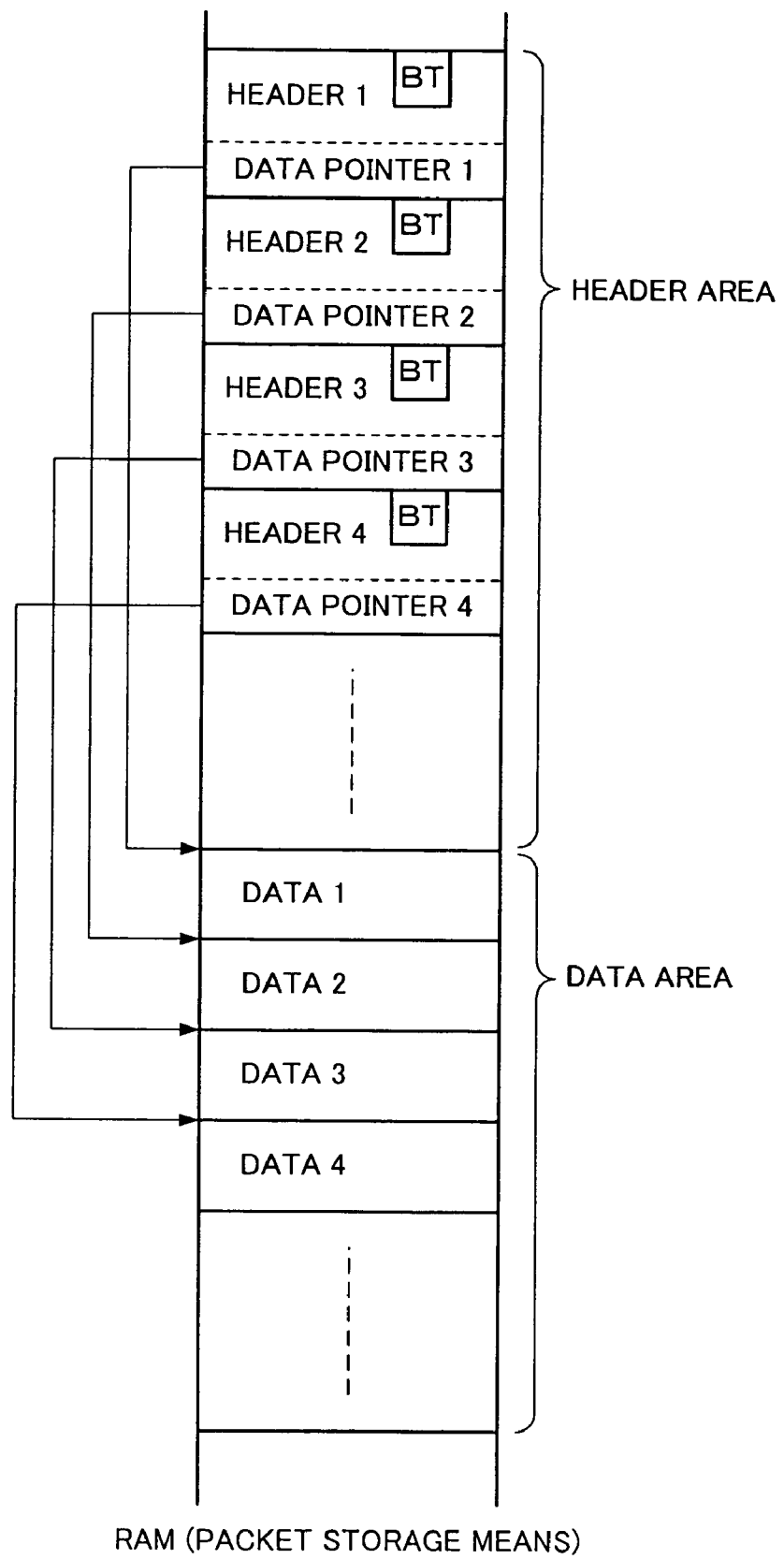
FIG. 11 is illustrative of a method of comprising the toggle bit BT within headers.

Note that in this embodiment of the invention, the RAM described with reference to FIG. 5 is divided into a header area and a data (ORB and stream) area. The headers stored in the header area and the data stored in the data area are linked by data pointers comprised within the headers. With this embodiment of the invention, the above described toggle bit BT (identification information) is comprised within the header that is written to the header area, as shown in FIG. 11. This configuration makes it possible for the firmware to detect the time at which the bus reset occurred in a simple manner, just by reading all the headers in the header area together and checking the values of BT in those headers. This enables a further decrease in the processing load on the firmware.

Note that the description with reference to FIG. 10 concerns a case in which the identification information is one bit of data, but the identification information can equally well be two or more bits of data. For example, the value of the identification information could be incremented to 1, 2, 3, etc., at C12, C13, and C14 of FIG. 10, instead of changing from zero to one or one to zero.

3.2 Bus Reset Pointer

Figure 12:
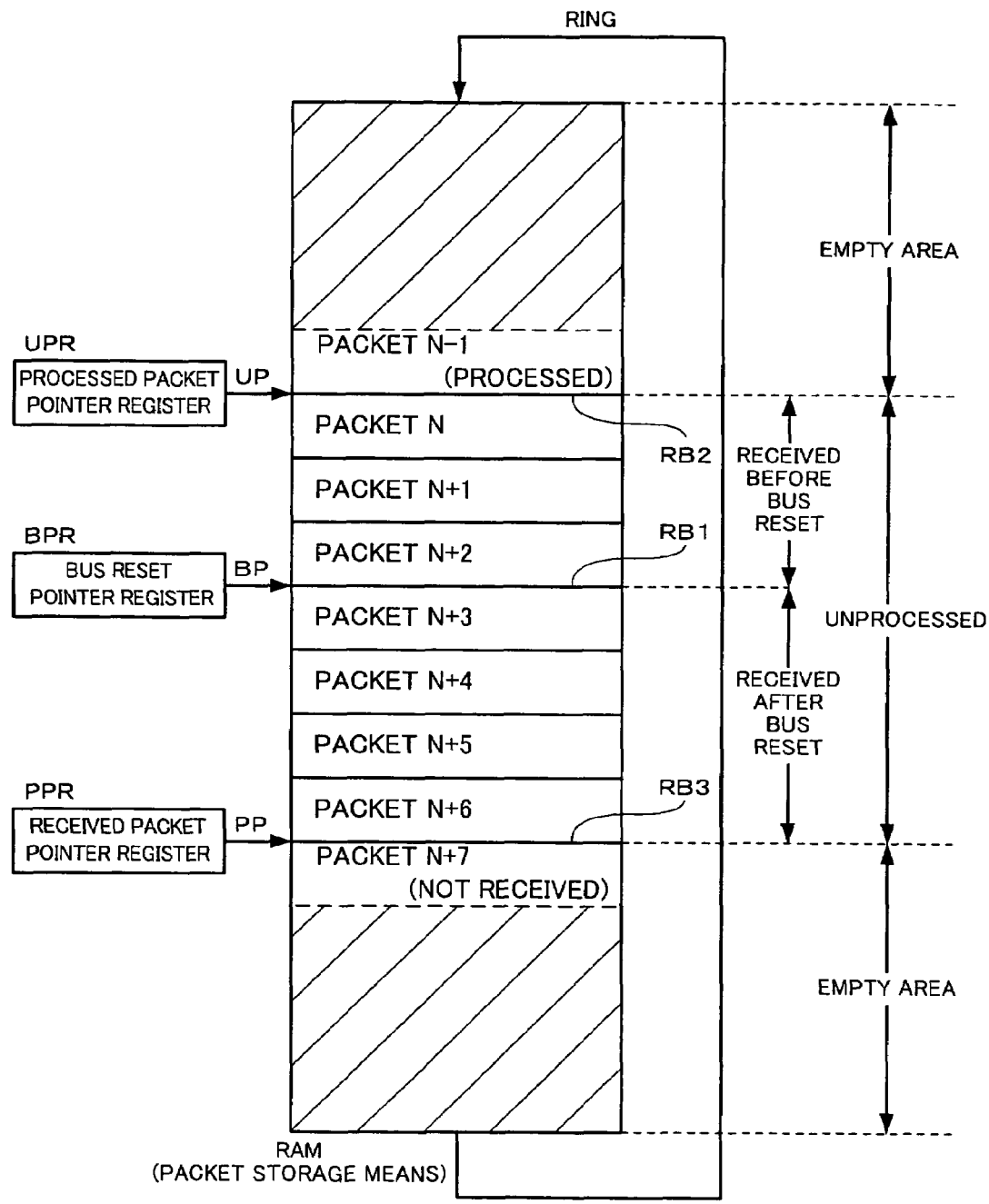
FIG. 12 is illustrative of the bus reset pointer.

This embodiment of the present invention is also provided with a bus reset pointer register (first pointer storage means) BPR enabling efficient detection of the time at which the bus reset occurred, as shown in FIG. 12.

In this case, a bus reset pointer BP held within the bus reset pointer register BPR specifies a boundary RB1 in RAM between packets N to N+2 received before a bus reset occurred and packets N+3 to N+6 received after the bus reset occurred. More specifically, the pointer BP indicates the start address of the next packet N+3 after the packet N+2 that was received immediately before the bus reset occurred.

This embodiment of the present invention is also provided with a processed packet pointer register UPR (second pointer storage means) and a received packet pointer register PPR (third pointer storage means), as shown in FIG. 12.

In this case, a processed packet pointer UP held in the register UPR specifies a boundary RBP2 in RAM between a processed (used) packet N−1 and an unprocessed (not used) packet N. More specifically, the pointer UP indicates the start address of the next packet N after the processed packet N−1.

Similarly, a received packet pointer PP held within the register PPR specifies a boundary RBP3 in RAM between the most recent (post) received packet N+6 and the non-received packet N+7 (the next packet that ought to have been received). More specifically, the pointer PP indicates the start address of the non-received packet N+7 that ought to have arrived next after the most recent received packet N+6.

The provision of the register BPR makes it possible for the firmware to distinguish between a packet received before the bus reset and a packet received after the bus reset, in a simple manner. The provision of the registers UPR and PPR also make it possible for the firmware to determine which of the packets has not been processed, in a simple manner (packets N to N+6 in FIG. 12 are unprocessed).

In particular, the pointer BP indicates the start address of the packet N+3 received immediately after the bus reset. The firmware can therefore start the processing of packets after the bus reset, by simply reading the pointer BP from the register BPR. The pointer UP indicates the start address of the unprocessed packet N. The firmware can therefore start the processing of unprocessed packets by simply reading the pointer UP from the register UPR.

Figure 13A:
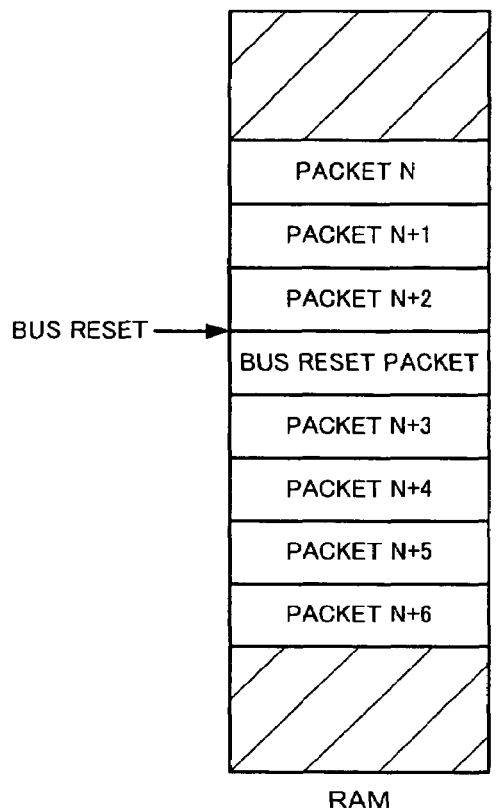
FIGS. 13A, 13B, and 13C are illustrative of the processing of the firmware then a bus reset packet is used and when a bus reset pointer is used.

Another method of distinguishing between a packet received before a bus reset and a packet received after the bus reset that could be considered is a method that utilizes a packet called a bus reset packet. The use of such a bus reset packet makes it possible to determine that packets N to N+2 that are stored before the bus reset packet are packets received before the bus reset, and packets N+3 to N+6 that are stored after the bus reset packet are packets received after the bus reset, as shown in FIG. 13A.

Figure 13B:
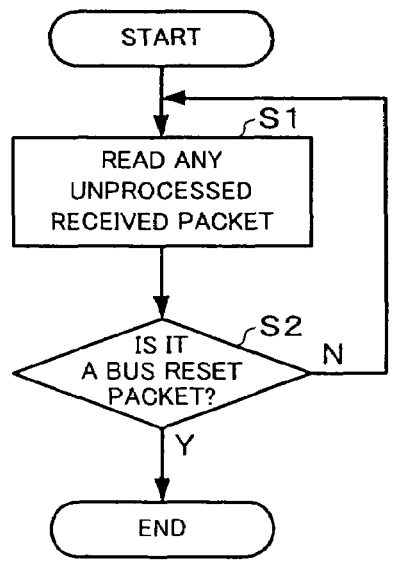

With this method, however, the firmware has to read unprocessed received packet in sequence from the RAM up until the bus reset packet, as shown in steps S1 and S2 in the flowchart FIG. 13B. This method therefore has a problem in that there is a heavy processing load on the firmware, and this problem is particularly severe if there is a large number of unprocessed packets accumulated in RAM.

Figure 13C:
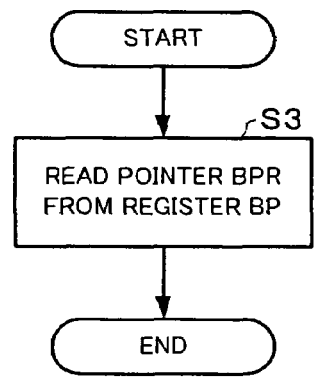

In contrast thereto, this embodiment of the invention that uses the bus reset pointer BP ensures that the firmware need only read the pointer BP from the register BPR, as shown in step S3 in FIG. 13C. The processing load on the firmware can therefore be dramatically reduced in comparison with the method shown in FIG. 13B.

Figure 14:
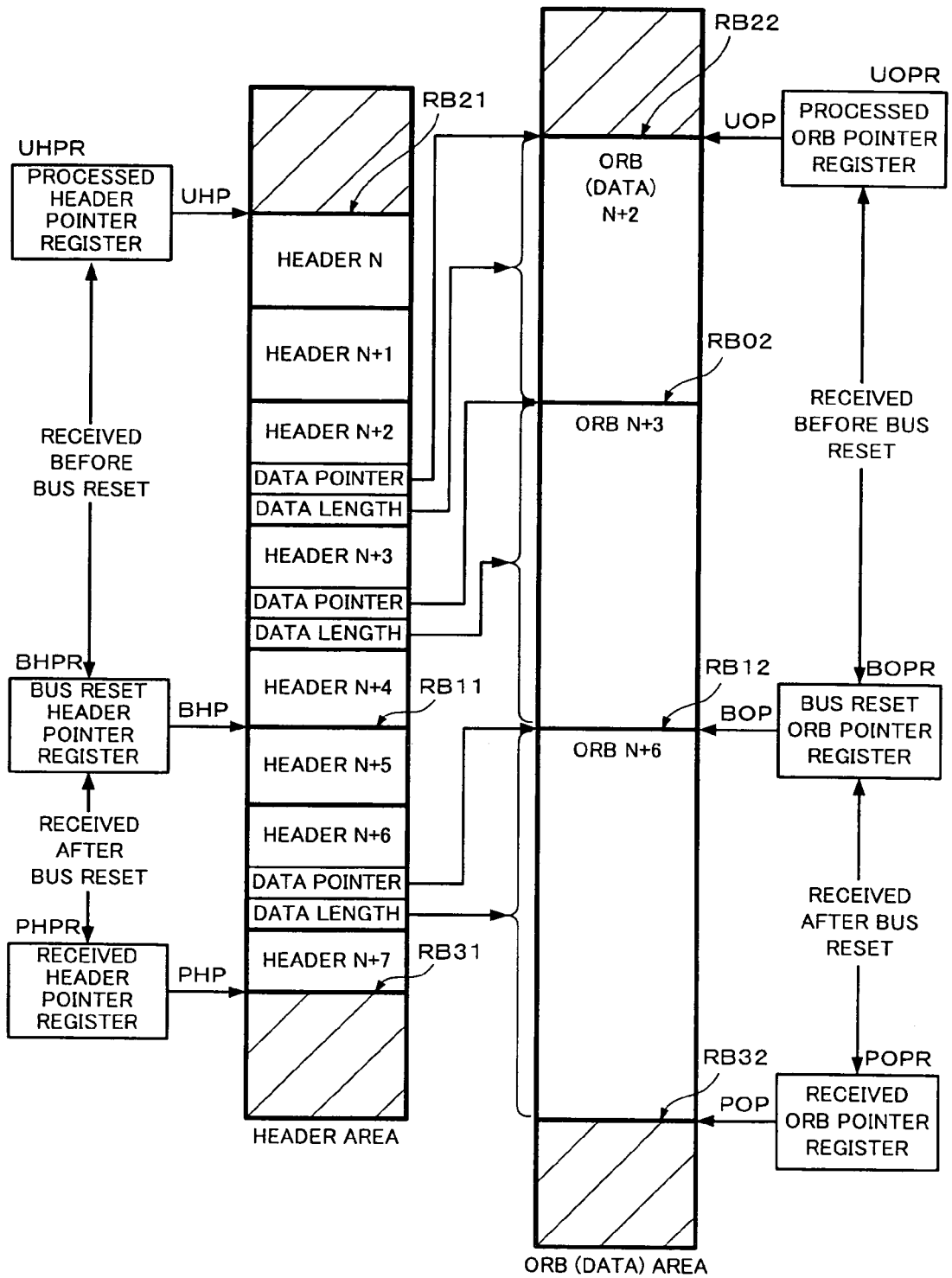
FIG. 14 is illustrative of the bus reset ORB pointer.

With this embodiment of the present invention, the RAM shown in FIG. 5 is divided into a header area and a data area. For that reason, a bus reset header pointer register BHPR (fourth pointer storage means) and a bus reset ORB pointer register BOPR (fifth pointer storage means) are provided as shown in FIG. 14, as the bus reset pointer register BR of FIG. 12.

A processed header pointer register UHPR and a processed ORB pointer register UOPR are also provided as the processed packet pointer register UPR. A received header pointer register PHPR and a received ORB pointer register POPR are provided as the received packet pointer register PPR.

In this case, pointers BHP (fourth pointer information), UHP, and PHP held within the registers BHPR, UHPR, and PHPR, respectively, specify boundaries RB11, RB21, and RB31 within the header area of the RAM.

Similarly, pointers BOP (fifth pointer information), UOP, and POP held within the registers BOPR, UOPR, and POPR, respectively, specify boundaries RB12, RB22, and RB32 within the ORB (first data) area of the RAM.

The advantages described below can be obtained by using the pointer BOP, which indicates the boundary RB12 of the bus reset in the ORB area, as shown in FIG. 14.

Figure 15A:
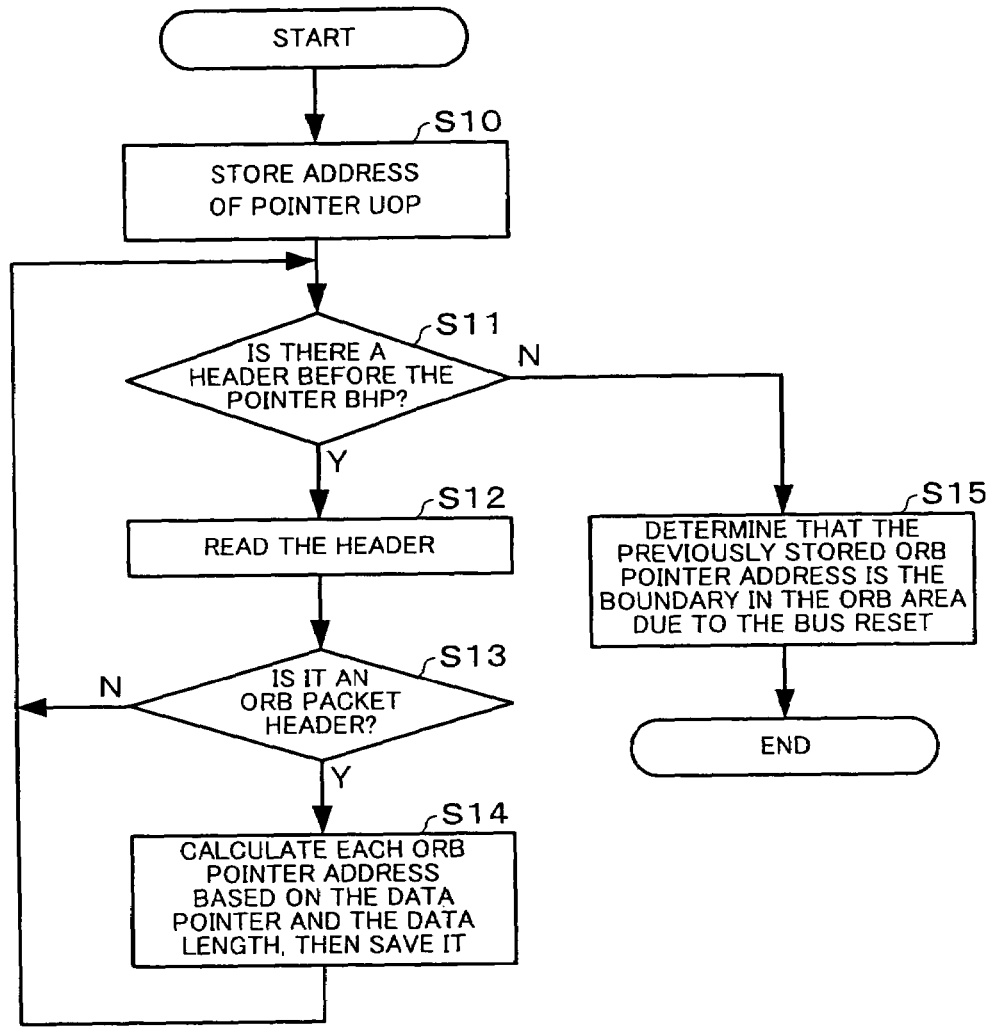
FIGS. 15A and 15B are flowcharts that are illustrative of the processing of the firmware when only a bus reset header pointer is used and when a bus reset ORB pointer is used.

In other words, since the boundary RB12 in the ORB area can be specified by a method using only a pointer BHP that indicates the boundary RB11 in the header area, the firmware must perform the processing shown in the flowchart of FIG. 15A.

The address of the pointer UOP is first stored (step S10). The system then determines whether or not there is a header in front of the pointer BHP (step 11) and, if there is one, it reads that header (step S12). The header N of FIG. 14 is read thereby, by way of example.

The system then determines whether the thus-read header is the header of a packet (ORB packet) having data in the ORB area (step S13). Since the headers N and N+1 in FIG. 14 are not the headers of ORB packets, the flow returns to steps S11 and S12 without proceeding to step S14. Since the headers N+2 and N+3 are ORB pointers, on the other hand, the flow proceeds to step S14 at that point, where the addresses of the ORB pointers (the boundaries RB02 and RB12) are calculated and stored, based on the data pointers and data lengths comprised within those headers. Since the next header N+4 is not an ORB pointer, the flow returns to S11 at that point. When that happens, since it is determined at step S11 that there is no header in front of the pointer BHP, the flow branches to step S15 where the address (RB12) of the ORB pointer stored immediately before is determined to be the boundary of the ORB area due to the bus reset.

As described above, the method of using the pointer BHP alone requires the firmware to perform a heavy processing load, as shown in FIG. 15A. This situation becomes particularly serious when the processing capabilities of the firmware are low and a large number of headers have accumulated in RAM.

Figure 15B:
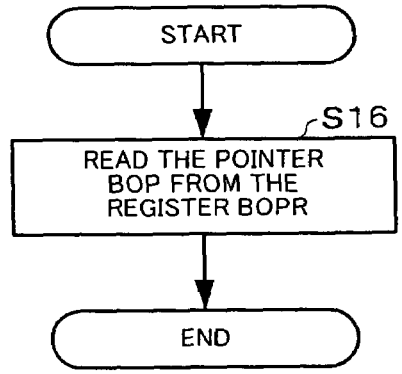

In contrast thereto, use of the pointer BOP makes it possible for the firmware to specify the boundary RB12 by simply reading the pointer BOP from the register BOPR, as shown in the flowchart of FIG. 15B. This therefore enables a dramatic reduction in the processing load on the firmware, in comparison with the method using the pointer BHP alone.

Under SBP-2, each node (initiator or target) has a 64-bit ID called EUI-64, in addition to the usual 16-bit node ID. In contrast to the node IDs which are reset by a bus reset and which are always likely to be completely different after a bus reset, each EUI-64 is unique to the corresponding node and is thus not changed after a bus reset. It is therefore necessary to link each EUI-64 to a new node ID after a bus reset and a large number of packets are transferred between the nodes for this linkage processing. For that reason, a large number of packets will accumulate in RAM within a short period after a bus reset. The number of these accumulated packets will increase as the number of nodes connected to the bus increases.

It is clear that, if the firmware (transaction layer) of each node were to place priority on processing the packets that were received before the bus reset in such a case, it is likely that the processing of those nodes will stall. If the processing of one node stalls, the other nodes will be affected thereby.

If a bus reset has occurred in this embodiment of the present invention, the firmware (processing means) first processes a packet that was received after the bus reset.

Figure 16:
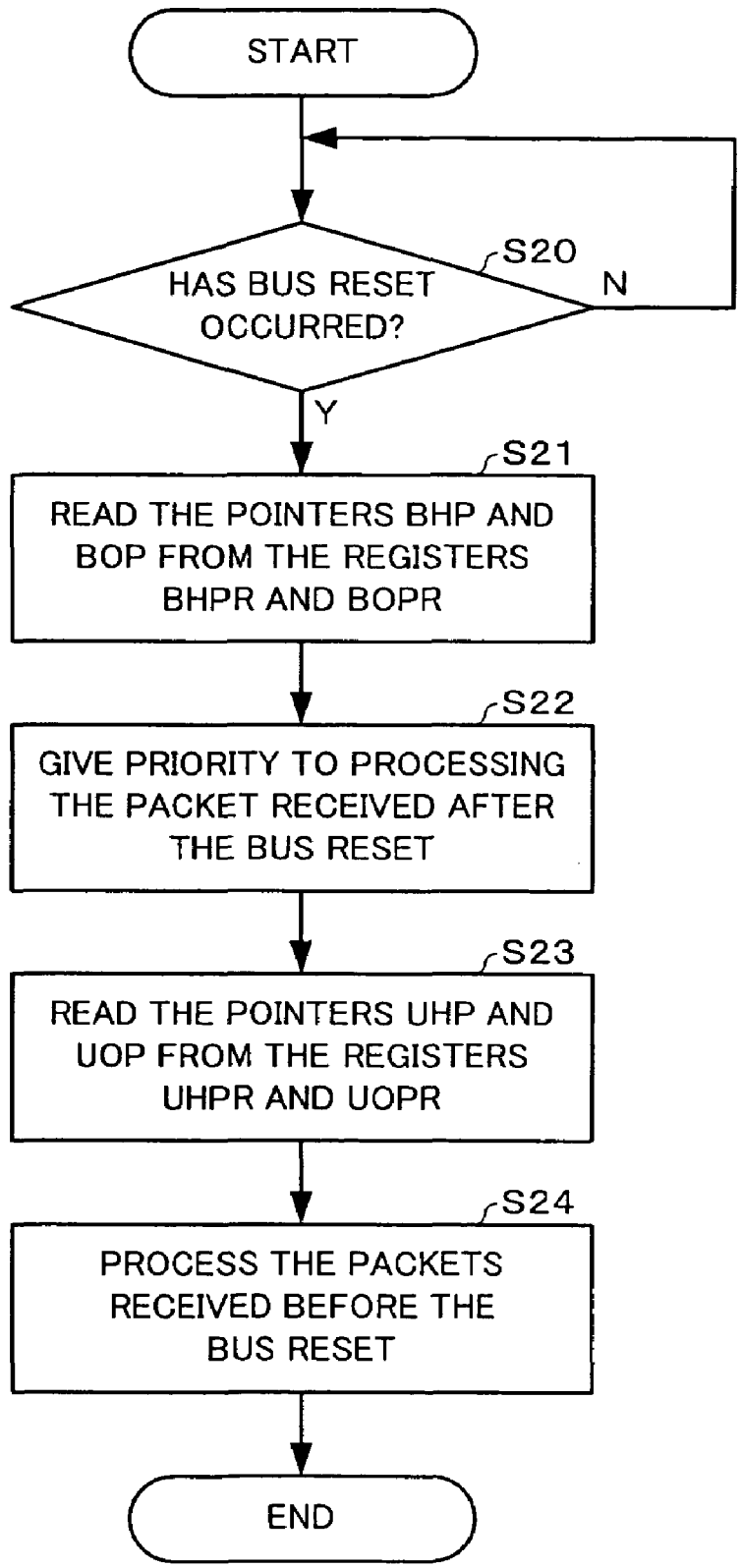
FIG. 16 is a flowchart that is illustrative of a method in which the processing give priority to a packet received after a bus reset.

In other words, if it is determined that a bus reset has occurred (step S20 in the flowchart of FIG. 16), the firmware reads the pointers BHP and BOP from the registers BHPR and BOPR (step S21). It then gives priority to processing a packet received after the bus reset (a packet linking the node ID and the EUI-64) (step S22). In other words, this embodiment of the invention provides the pointers BHP and BOP beforehand, as described previously, making it possible to specify a packet received after a bus reset by the simple process of reading these pointers from the registers BHPR and BOPR. There is therefore no significant increase in the processing load on the firmware, even if the processing gives priority to the packet received after a bus reset in this manner.

The firmware then reads the pointers UHP and UOP from the registers UHPR and UOPR (step S23) and processes the packets received before the bus reset (step S24). In other words, it proceeds to processing such as determining whether or not to destroy the packets or whether they are for a transaction that was halted by the bus reset.

3.3 Bus Reset Transmission Halt Status

Figure 17A:
FIGS. 17A, 17B, 17C, and 17D are illustrative of the bus reset transmission halt status.

The usual transmission processing is started by the firmware issuing a transmission start command (by writing the transmission start command to the register 46 of FIG. 4), as shown in FIG. 17A. When this transmission start command is issued, bus arbitration occurs and, if the firmware is successful in the arbitration, actual packet transfer over the bus starts. If an ACK (acknowledgment) is received from another node, the transmission complete status is passed to the firmware.

Figure 17B:
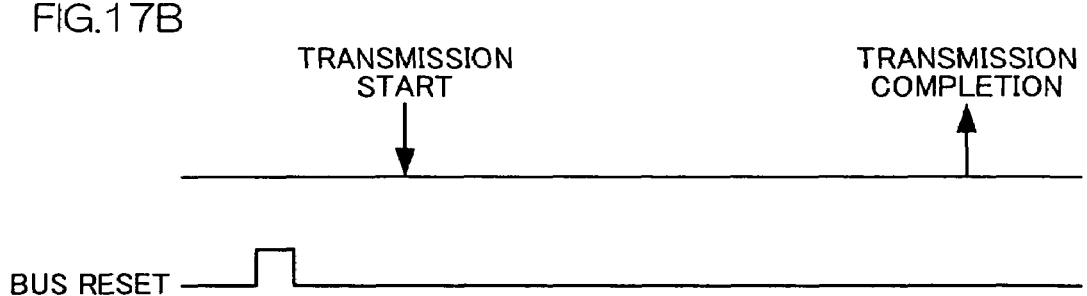

If a bus reset had occurred immediately before the issue of the transmission start command, as shown in FIG. 17B, the usual transmission processing is performed in a similar manner to that shown in FIG. 17A. If a bus reset occurs immediately after the issue of the transmission start command, on the other hand, the transmission is halted, no ACK is returned from another node, and thus the transmission complete status is not passed to the firmware, as shown in FIG. 17C.

Figure 17C:
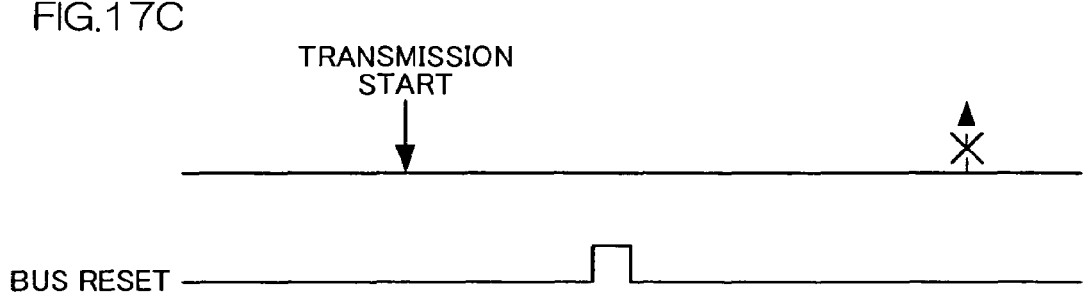

If such a bus reset occurs slightly before the firmware has issued the transmission start command (written to the register), however, the firmware cannot determine which of the cases shown in FIGS. 17B and 17C has occurred.

In other words, after issuing the transmission start command (step S30), the firmware determines whether or not a bus reset has occurred (step S31). If no bus reset has occurred, it waits for the arrival of the transmission complete status (step S32). This is the case shown in FIG. 17B. If a bus reset has occurred, on the other hand, the firmware does not wait for the transmission complete status and cancels the transmission (step S33). This is the case shown in FIG. 17C.

Figure 18A:
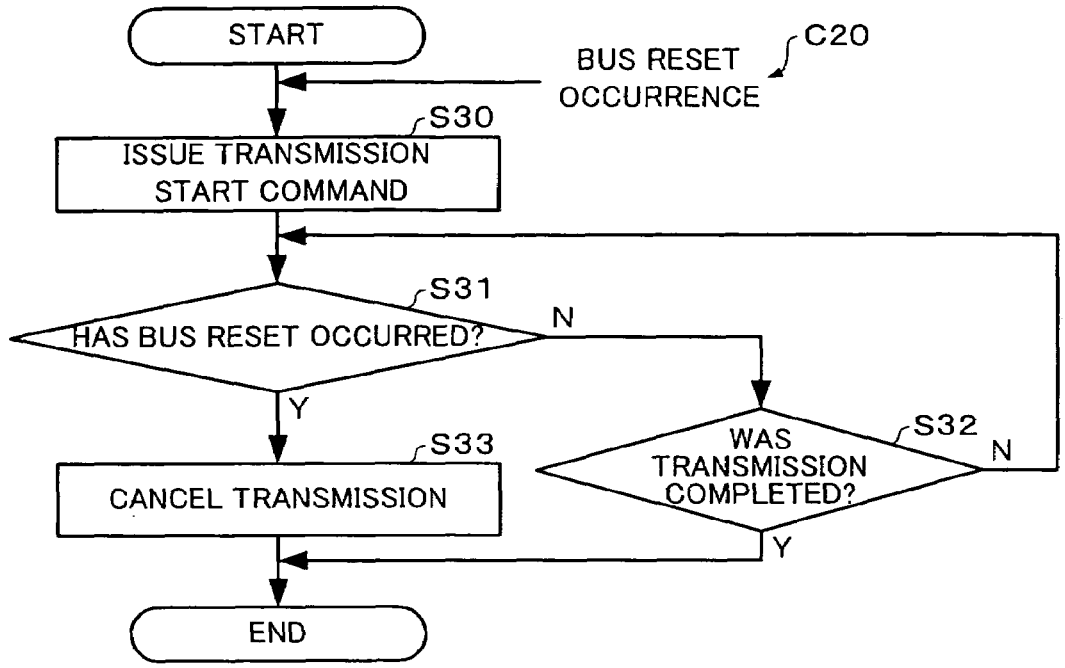
FIGS. 18A and 18B are flowchart illustrative of the processing of the firmware when the bus reset transmission halt status is used and when it is not used.

If the bus reset occurred slightly before the issue of the transmission start command, as shown at C20 in FIG. 18A, the processing of the firmware loops at steps S31 and S32, and thus the processing stalls. In other words, it is not possible to detect the occurrence of the bus reset, so the transmission is not cancelled (the processing does not proceed to step S33) and the transmission complete status is not returned, which means that the processing loops at steps S31 and S2.

Figure 17D:
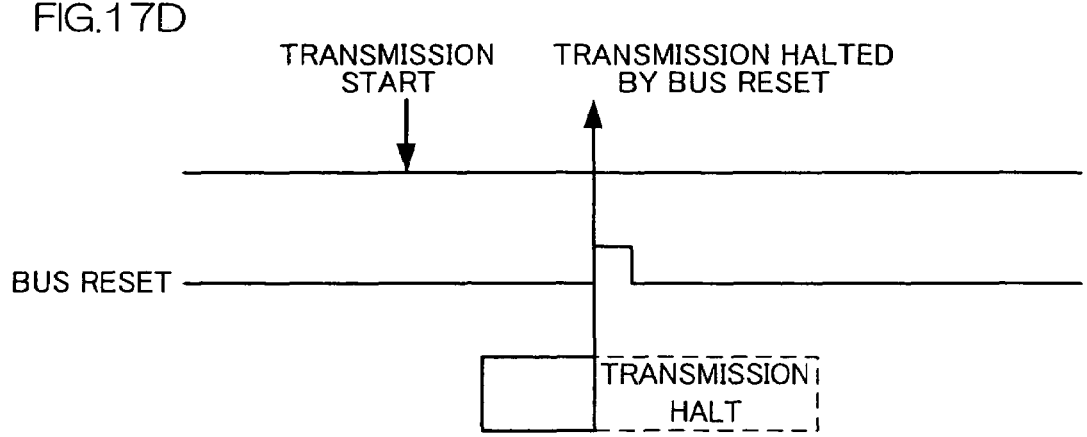
Figure 18B:
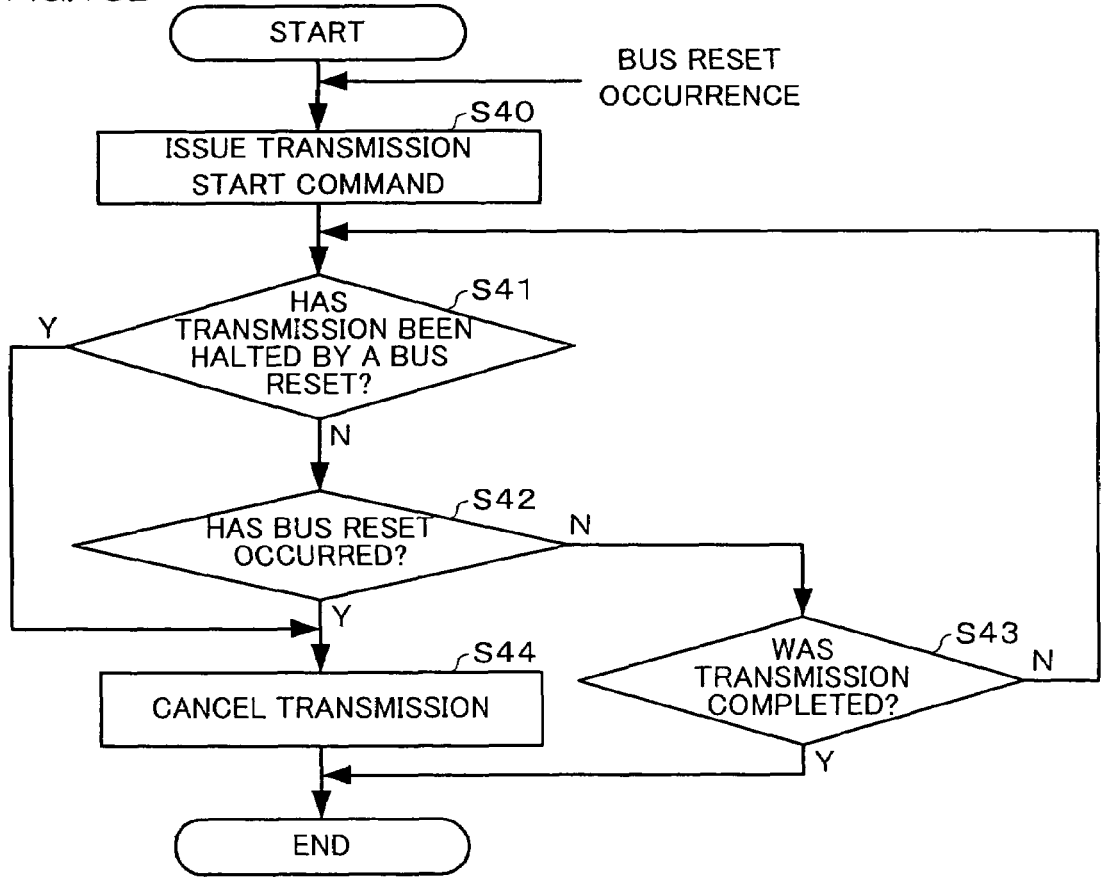

With this embodiment of the present invention, the status indicating that transmission has been halted by a bus reset, as shown in FIG. 17D, is passed to the firmware. More specifically, if a bus reset occurs and the hardware of the data transfer control device performs processing to halt the transmission, the bus reset transmission halt status is written to the register 46 of FIG. 4. This makes it possible for the firmware to determine whether or not transmission has been halted by the bus reset, as shown in step S41 of FIG. 18B. If it is determined that transmission has been halted by a bus reset, the configuration is such that transmission is canceled without waiting for the transmission complete status (step S44). This makes it possible to avoid a situation in which the processing of the firmware stalls.

4. Detailed Example

4.1 Derailed Configuration of Reception Side

Figure 19:
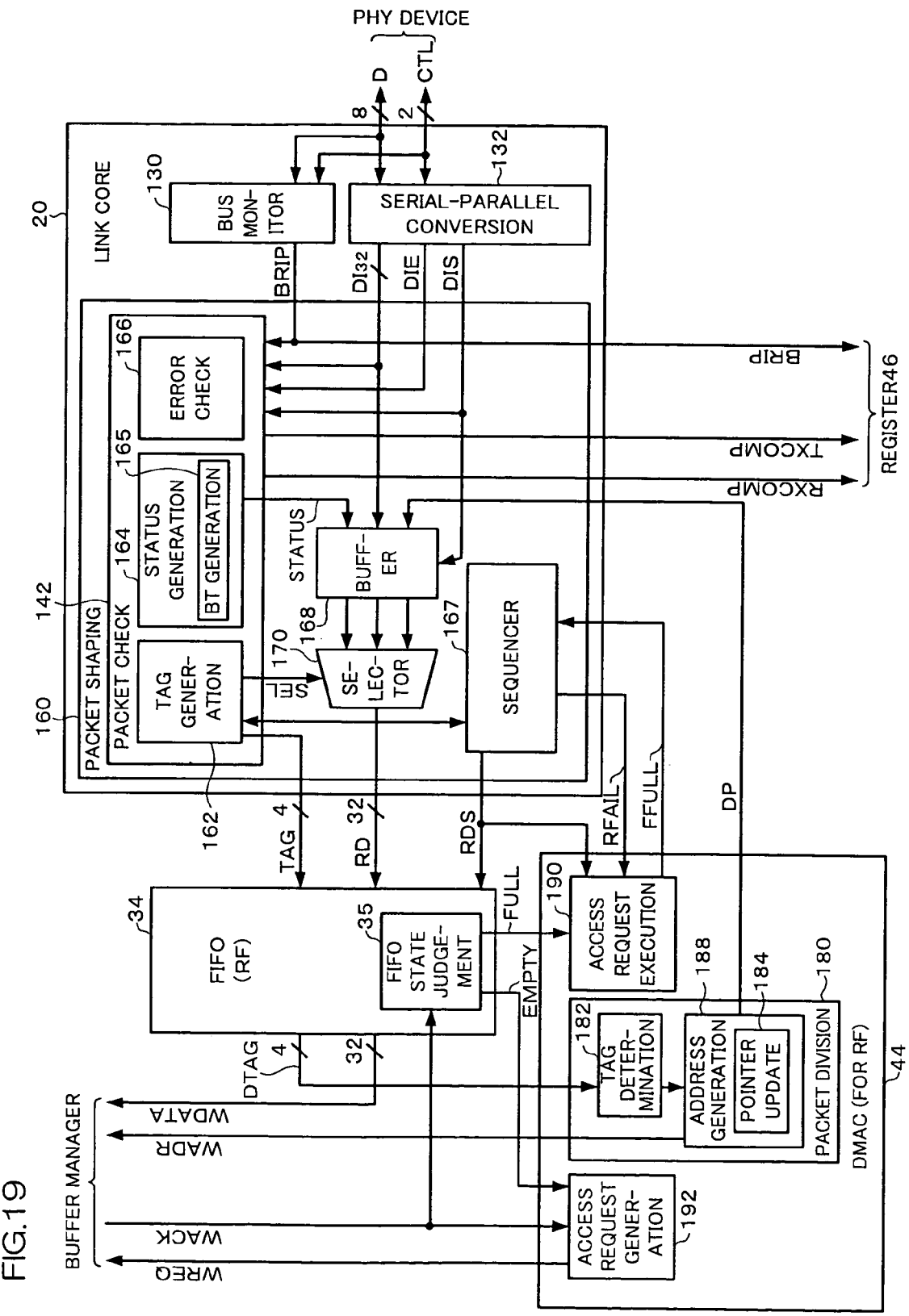
FIG. 19 shows details of the configuration of the reception side.

The description now turns to details of the configuration of the reception side. An example of the detailed configuration of the link core 20 (link means), a FIFO 34, and the DMAC 44 (write means) is shown in FIG. 19.

The link core 20 comprises a bus monitor circuit 130, a serial-parallel conversion circuit 132, and a packet shaping (reforming) circuit 160.

The bus monitor circuit 130 in this case monitors an 8-bit wide data bus D and a 2-bit wide control bus CTL that are connected to a PHY device by the PHY interface 10.

The serial-parallel conversion circuit 132 converts the data on the data bus D into 32-bit data.

Figure 20:
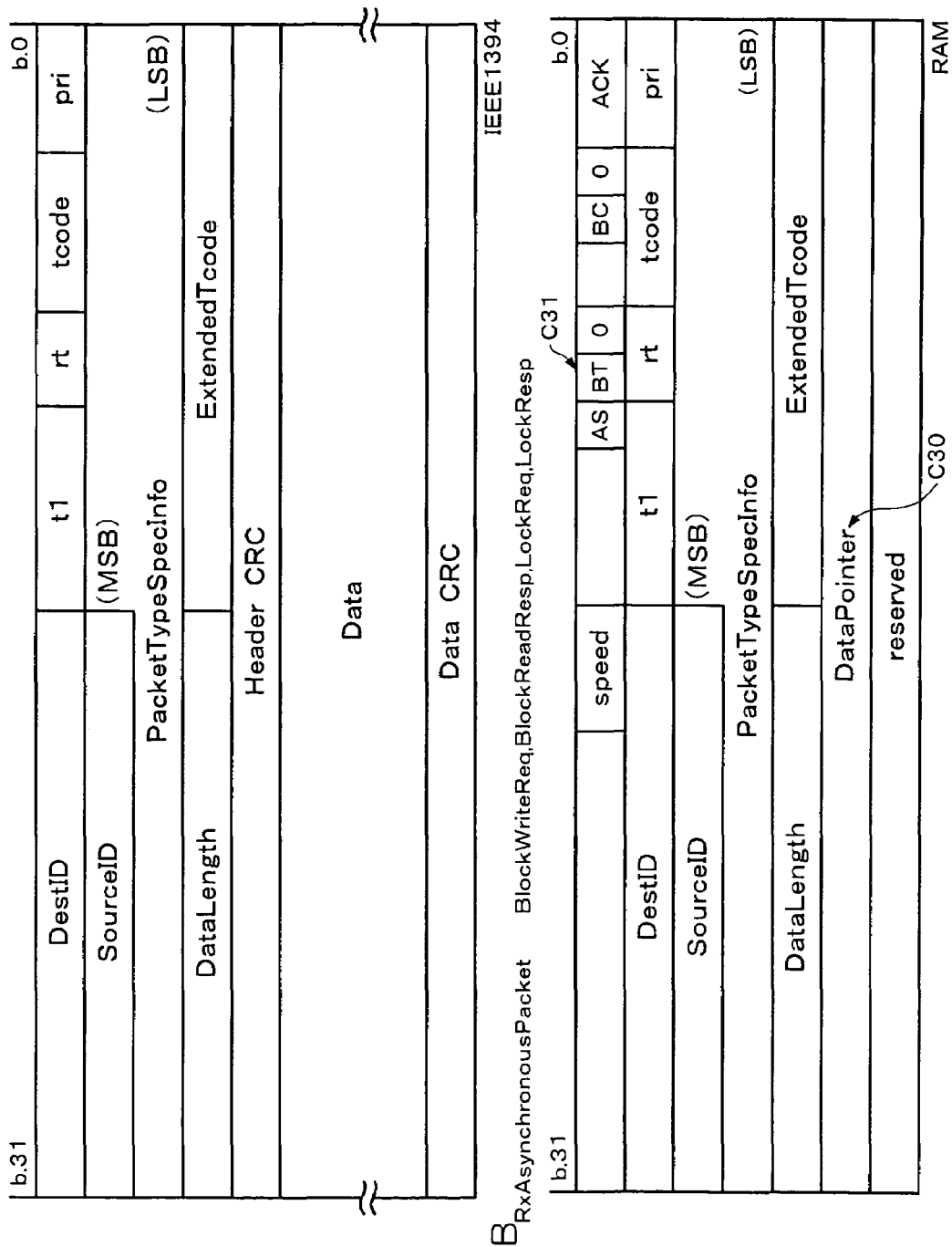
FIG. 20A shows the format of a packet having block data in asynchronous transfer in accordance with the IEEE 1394 standard and FIG. 20B shows the format of the header portion of a packet stored in RAM and having block data in asynchronous reception.

The packet shaping circuit 160 shapes (reforms) each packet that has been transferred in from another node, into a form that can be used by an upper layer. The format of a packet having block data in asynchronous transfer in accordance with the IEEE 1394 standard is shown in FIG. 20A by way of example. The format of a header portion (stored in the header area of the RAM 80) of a packet having block data in asynchronous reception is shown in FIG. 20B. The thus-configured embodiment of the present invention shapes a packet that is in the format shown in FIG. 20A into a packet of the format shown in FIG. 20B, so that it can be used by an upper layer such as the firmware.

The packet shaping circuit 160 comprises a packet check circuit 142, a sequencer 167, a buffer 168, and a selector 170; and the packet check circuit 142 comprises a tag generation circuit 162, a status generation circuit 164, and an error check circuit 166.

The packet check circuit 142 in this case is a circuit that diagnoses packets. The tag generation circuit 162 generates tags that are information for identifying write areas in packets, and the status generation circuit 164 creates various statuses to be added to the packets. The error check circuit 166 investigates error check information, such as parity information and CRCs, which are comprised within each packet, to detect any errors therein.

The sequencer 167 creates various control signals. The buffer 168 and the selector 170 select one of DI from the serial-parallel conversion circuit 132, a status from the packet check circuit 142, or data pointers from the DMAC 44, using a SEL signal from the packet check circuit 142.

The FIFO 34 functions as a buffer for adjusting the phase of RD (which is output data from the link core 20) and the phase of WDATA (which is data to be written to the RAM 80), and it comprises a FIFO state judgement circuit 35. The FIFO state judgement circuit 35 makes an EMPTY signal go active when the FIFO is empty and a FULL signal go active when the FIFO is full.

The DMAC 44 comprises a packet division circuit 180, an access request execution circuit 190, and an access request generation circuit 192.

The packet division circuit 180 in this case divides packets that have been shaped by the packet shaping circuit 160 into data, headers, and other parts, based on the tags (DTAGs), then writes those parts to the various RAM areas (see FIG. 5).

The access request execution circuit 190 executes access requests from the link core 20. When the FULL signal from the FIFO state judgement circuit 35 is active, the access request execution circuit 190 makes a FFULL signal go active. The sequencer 167 within the packet shaping circuit 160 makes RDS, which is a RD (RxData) strobe signal, go active on condition that FFULL is not active.

Note that RFAIL is a signal used by the sequencer 167 to inform the access request execution circuit 190 that a reception has failed.

The access request generation circuit 192 issues an access request to the RAM 80. The access request generation circuit 192 receives WACK (which is a write acknowledgment from the buffer manager 70) and EMPTY from the FIFO state judgement circuit 35, and outputs WREQ (which is a write request) to the buffer manager 70.

The packet division circuit 180 comprises a tag determination circuit 182 and an address generation circuit 188, as shown in FIG. 19, and the address generation circuit 188 comprises a pointer update circuit 184.

The tag determination circuit 182 in this case identifies the tags (DTAGs) created by the tag generation circuit 162 and determines the write area for the output WDATA of the FIFO 34.

The pointer update circuit 184 comprised within the address generation circuit 188 sequentially updates (increments or decrements) the pointers (data pointer and header pointer) in the thus-determined area. The address generation circuit 188 generates an address as indicated by the sequentially updated pointers and outputs it as WADR to the buffer manager 70. The address generation circuit 188 outputs a data pointer DP (a data pointer for the reception ORB area or a data pointer for the reception stream area) to the packet shaping circuit 160. The packet shaping circuit 160 embeds this data pointer in the header of the packet (see C30 in FIG. 20B). This makes it possible to link each header stored in the header area to the corresponding data stored in the data area (see FIG. 11).

Examples of the tags (DTAGs) used by this embodiment of the present invention are shown in FIG. 21. If the tag is (0001) or (0010), as shown in FIG. 21 by way of example, the header of the received packet (the output WDATA of the FIFO 34) is written to the reception header area of FIG. 5. Similarly, if the tag is (0100), the data of the received packet is written to the reception ORB area, or if the tag is (0101), the data of the received packet is written to the reception stream area.

If the tag is (1001) or (1010), the header of the received packet is written to the reception header area for hardware (HW). Similarly, if the tag is (1100), the data of the received packet is written to the reception ORB area for HW, or if the tag is (1101) the data of the received packet is written to the reception stream area for HW. Note that "for hardware/HW" in this case denotes that this data is for the SBP-2 core 84 of FIG. 4.

4.2 BT Generation Circuit

The status generation circuit 164 comprises a BT generation circuit 165. This BT generation circuit 165 generates the toggle bit BT that was described with reference to FIG. 10. The thus generated BT is embedded in the header of packet after it has been shaped, as shown at C31 in FIG. 20B.

Figure 22A:
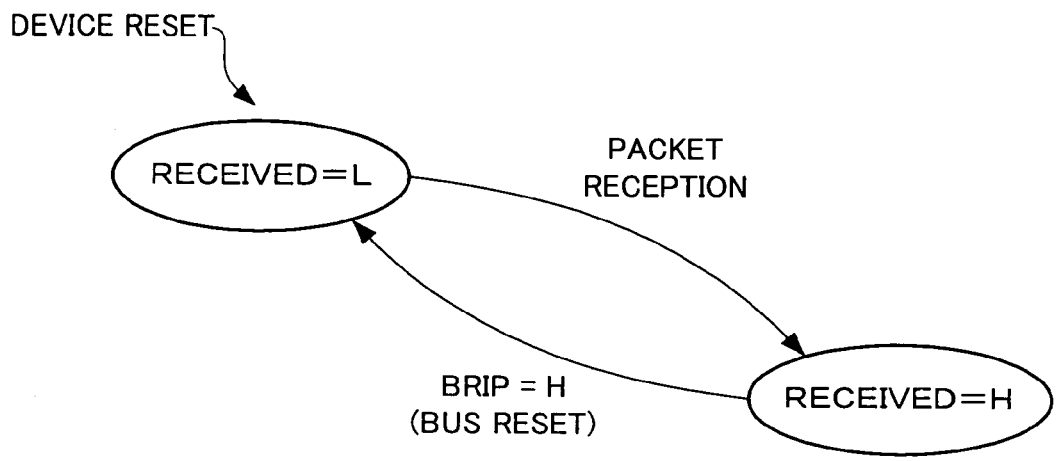
FIGS. 22A and 22B are state transition diagrams of the BT generation circuit.
Figure 22B:
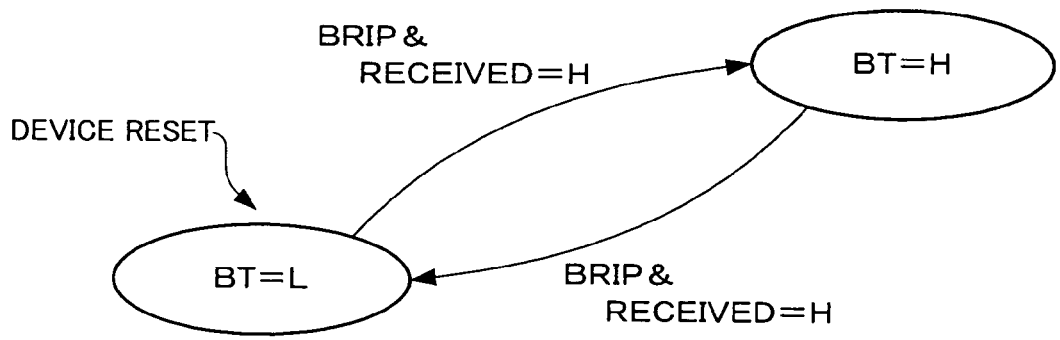

State transition diagrams of the BT generation circuit 165 are shown in FIGS. 22A and 22B.

In FIG. 22, RECEIVED is an internal signal of the BT generation circuit 165 and BRIP is a signal indicating that a bus reset is in progress. This BRIP signal is generated by the bus monitor circuit 130 of FIG. 19. In other words, the bus monitor circuit 130 accepts status information from the PHY device through the data bus D and determines whether or not a bus reset has occurred from this status information. If the bus monitor circuit 130 determines that a bus reset has occurred, it sets BRIP to high and returns it to low thereafter.

As shown in the state transition diagram of FIG. 22A, RECEIVED goes from low to high on condition that a packet has been received, or from high to low on condition that BRIP is high. As shown in the state transition diagram of FIG. 22B, the toggle bit BT toggles from low to high or from high to low on condition that BRIP and RECEIVED are both high.

Figure 23:
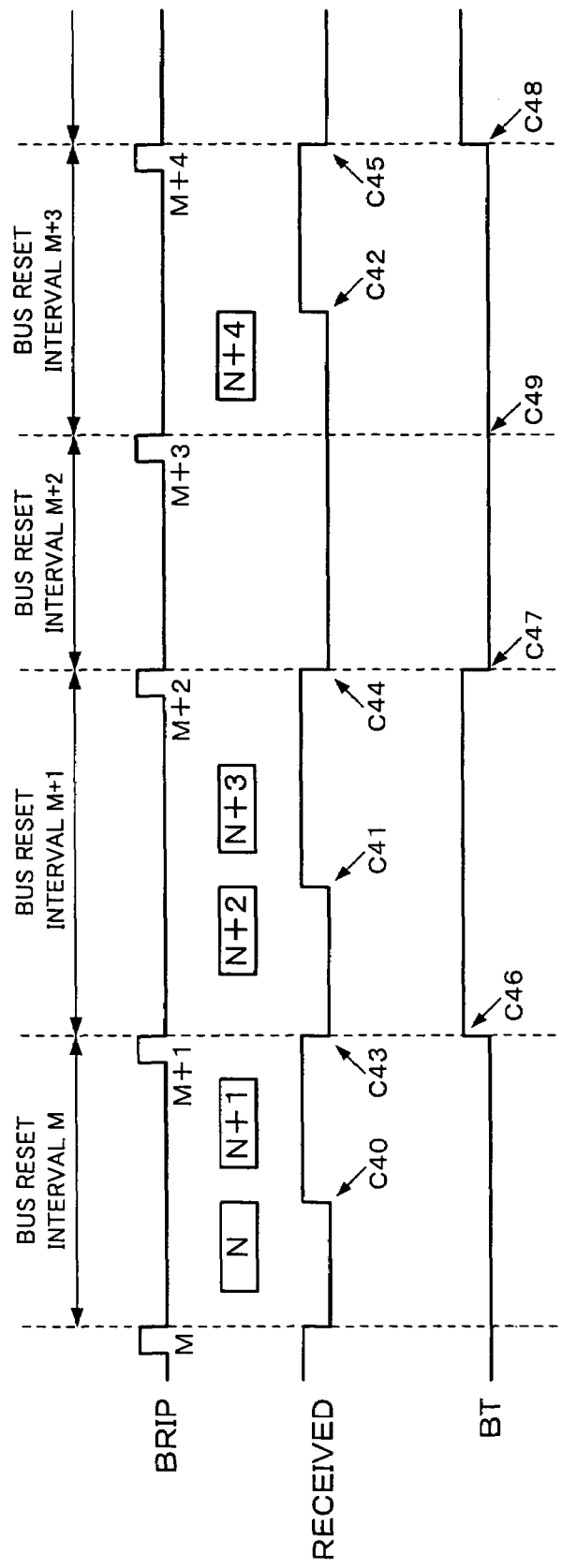
FIG. 23 is a timing waveform chart that is illustrative of the operation of the BT generation circuit.

A timing chart of the above signals is shown in FIG. 23. C40, C41, and C42 in FIG. 23 indicate points at which RECEIVED goes from low to high because a packet has been received. C43, C44, and C45 indicate points at which RECEIVED goes from high to low because BRIP (the bus-reset-in-progress signal) has gone high.

C46, C47, and C48 indicate points at which BT toggles from low to high or from high to low because both BRIP and RECEIVED are high. At C49, on the other hand, BT does not change because RECEIVED is not high. In other words, since no packet was received during the bus reset interval M+2, BT does not change even if a bus reset occurred (i.e., BRIP went high) during that time. This configuration makes it possible to generate the toggle bit BT in such a manner that it changes whenever sequentially received packets are packets received during different bus reset intervals, as described with reference to FIG. 10.

4.3 Pointer Registers

Figure 24:
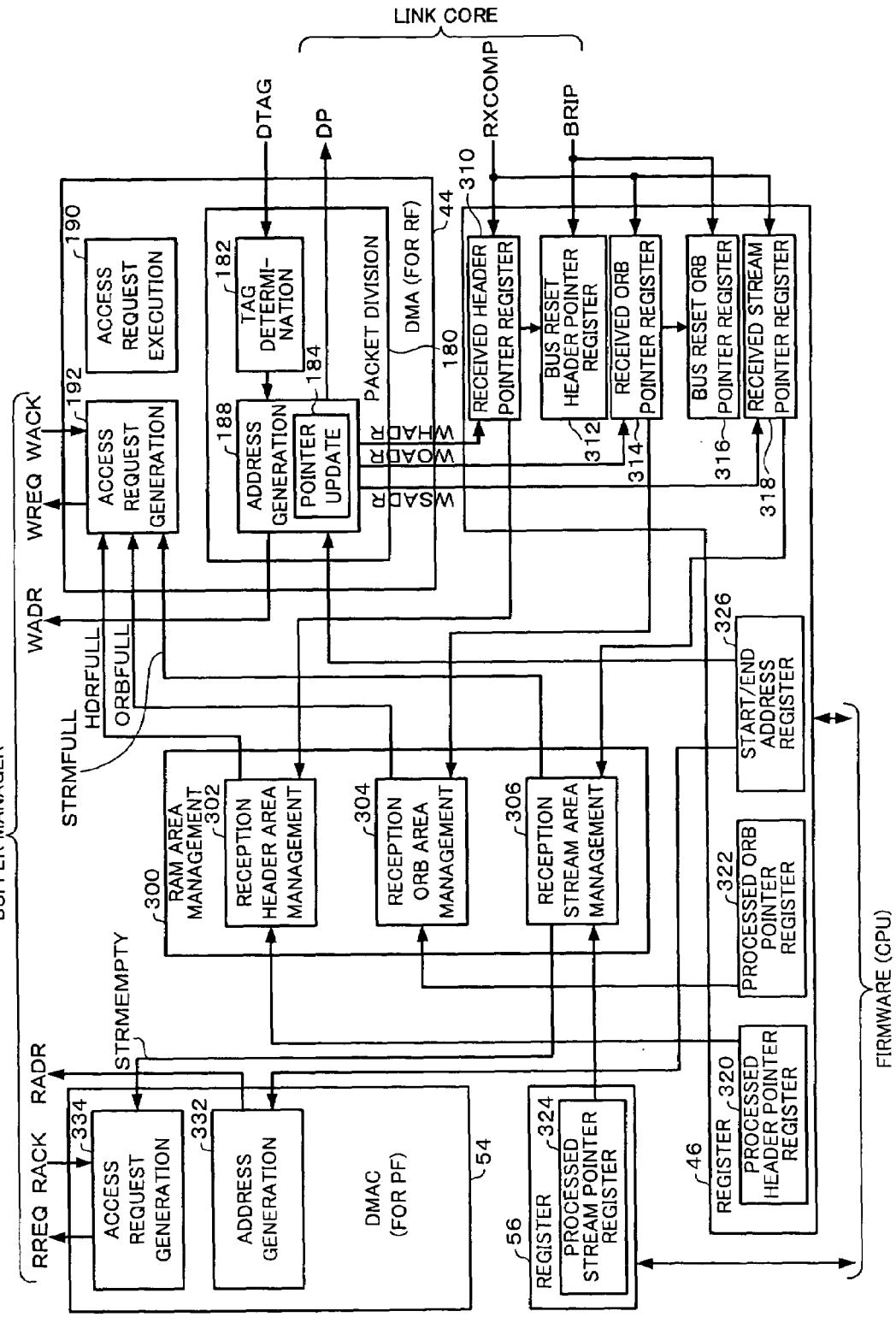
FIG. 24 is illustrative of details of the various pointer registers.

The description now turns to details of the pointer registers of FIG. 14, using FIG. 24 for reference.

Registers 310, 314, and 318 are registers for storing the received header pointer, the received ORB pointer, and the received stream pointer, respectively (see FIG. 14). These registers 310, 314, and 318 receive WHADR (address of the header area), WOADR (address of the ORB area), and WSADR (address of the stream area) from the address generation circuit 188. The registers 310, 314, and 318 also receive a reception completed signal RXCOMP from the link core 20. The registers 310, 314, and 318 fetch and store WHADR, WOADR, and WSADR from the address generation circuit 188 at the timing at which this RXCOMP goes active. This makes it possible to store the addresses of the boundaries RB31, RB32, etc., of FIG. 14.

Registers 312 and 316 are registers for storing the bus reset header pointer and bus reset ORB pointer, respectively (see FIG. 14). These registers 312 and 316 receive the bus-reset-in-progress signal BRIP from the link core 20. The registers 312 and 316 fetch and store the addresses that are stored in the registers 310 and 314 at the timing at which this BRIP goes active. This makes it possible to store the addresses of the boundaries RB11 and RB12 of FIG. 14.

Registers 320, 322, and 324 are registers for storing the processed header pointer, the processed ORB pointer, and the processed stream pointer, respectively (see FIG. 14).

A start/end address register 326 stores the start address and end address of each area shown in FIG. 5. Address generation circuits 188 and 332 control the generation of addresses, based on the start and end addresses from the register 326. More specifically, they update the pointers sequentially, using each start address as a start point. If a pointer has passed an end address, the control is such that the pointer returns to the corresponding start address (ring buffer structure).

The RAM area management circuit 300 comprises a reception header area management circuit 302, a reception ORB area management circuit 304, and a reception stream area management circuit 306.

The reception header area management circuit 302 receives the received header pointer from the register 310 and the processed header pointer from the register 320, and outputs a signal HDRFULL indicating that the reception header area is full to the access request generation circuit 192.

The reception ORB area management circuit 304 receives the received ORB pointer from the register 314 and the processed ORB pointer from the register 322, and outputs a signal ORBFULL indicating that the reception ORB area is full to the access request generation circuit 192.

The reception stream area management circuit 306 receives the received stream pointer from the register 318 and the processed stream pointer from the register 324, outputs a signal STRMFULL indicating that the reception stream area is full to the access request generation circuit 192. It also outputs a signal STRMEMPTY indicating that the reception stream area is empty to an access request generation circuit 334.

The access request generation circuits 192 and 334 receive these full and empty signals and determine whether or not to output a write request WREQ or read request RREQ to the buffer manager 70.

4.4 Bus Reset Transmission Halt Status

Figure 25:
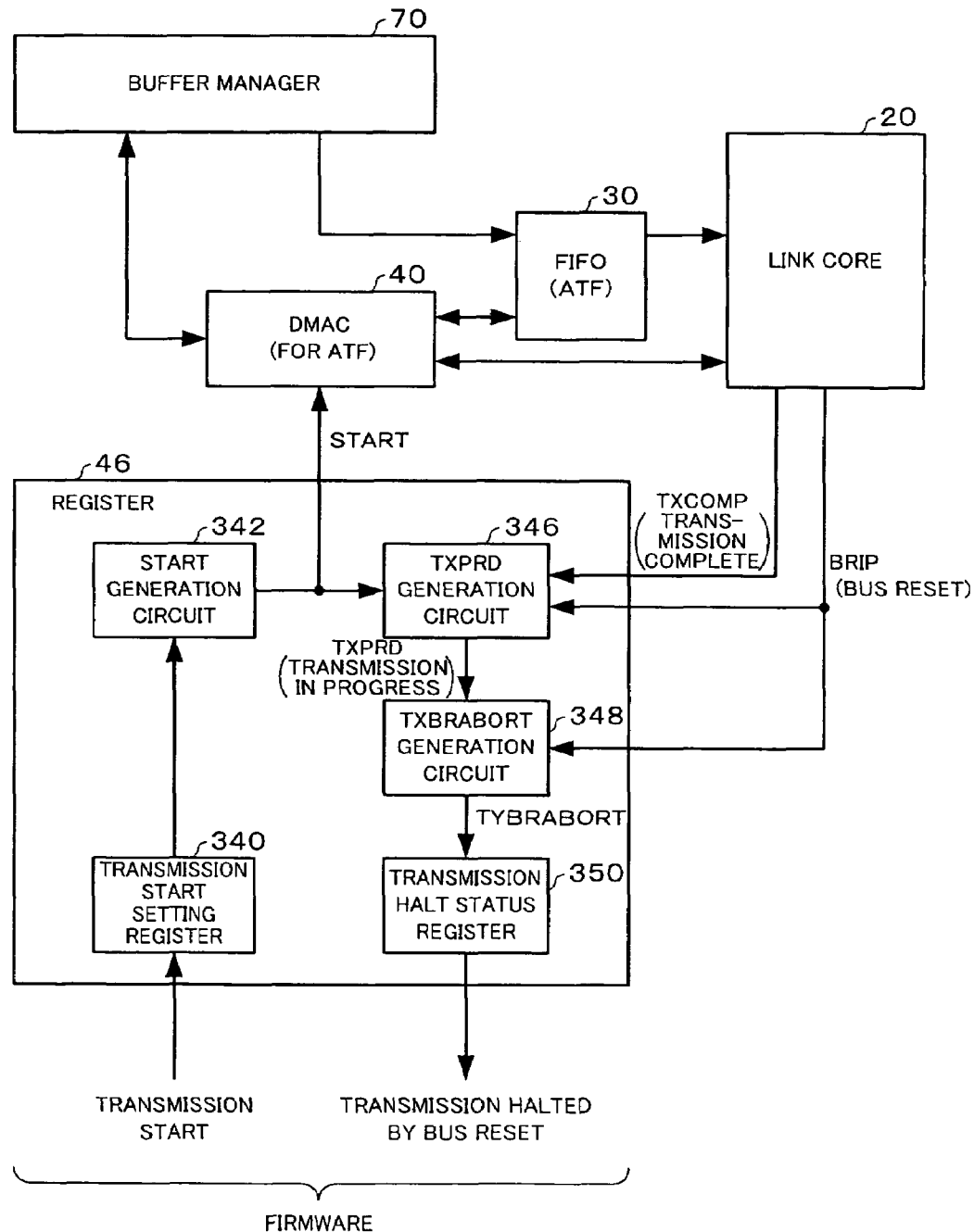
FIG. 25 is illustrative of details of the bus reset transmission halt status.

The description now turns to details of the bus reset transmission halt status, with reference to FIGS. 25 and 26.

In FIG. 25, the firmware writes a transmission start command to a transmission start setting register 340. When that happens, a START generation circuit 342 makes a START signal go active, as shown at C60 in FIG. 26. When that happens, the DMAC 40 outputs a read request to the buffer manager 70 and transmission starts.

When a TXPRD generation circuit 346 receives the START signal, it makes a TXPRD signal go active to show that transmission is in progress, as shown at C61. If packet transfer ends without problems and the link core 20 makes a transmission complete signal TXCOMP go active, as shown at 62, the TXPRD signal goes inactive.

If BRIP signal goes active (i.e., if a bus rest occurs) during transmission (when TXPRD is active), as shown at C63, a TXBRABORT generation circuit 348 of FIG. 25 makes a TXBRABORT signal go active, as shown at C64. The status indicating that transmission has been halted by the bus reset is passed to the firmware through a transmission halt status register 350.

When there is no transmission in progress (when TXPRD is inactive), on the other hand, TXBRABORT does not go active even if a bus reset occurs and BRIP goes active, as shown at C65 in FIG. 26.

Thus this embodiment of the present invention ensures that the bus reset transmission halt status is passed to the firmware only when transmission has been halted because a bus reset occurred during that transmission.

5. Electronic Equipment

The description now turns to examples of electronic equipment comprising the data transfer control device of this embodiment of the invention.

Figure 27A:
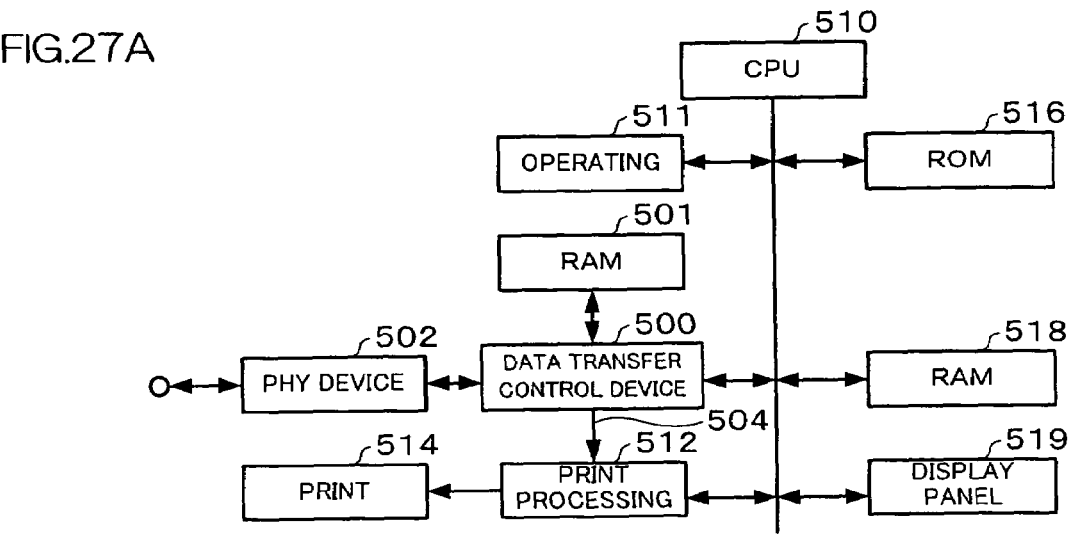
FIGS. 27A, 27B, and 27C show examples of the internal block diagrams of various items of electronic equipment.
Figure 28A:
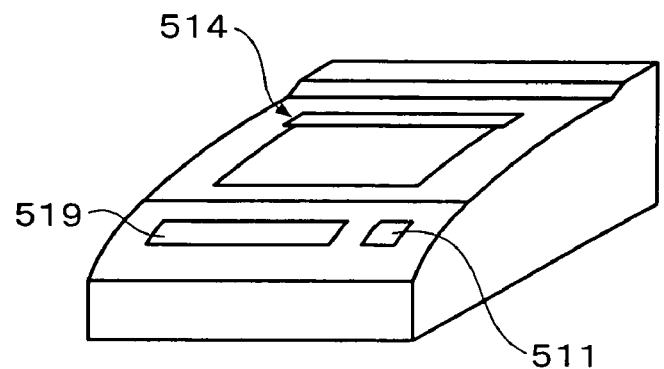
FIGS. 28A, 28B, and 28C show external views of various items of electronic equipment.

An internal block diagram of a printer that is one example of such electronic equipment is shown in FIG. 27A with an external view thereof being shown in FIG. 28A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY device 502 and a data transfer control device 500 is sent directly to a print processing section 512 over a bus 504. The print data is subjected to given processing by the print processing section 512 and is output for printing to paper by a print section (a device for outputting data) 514 comprising components such as a print head.

Figure 27B:
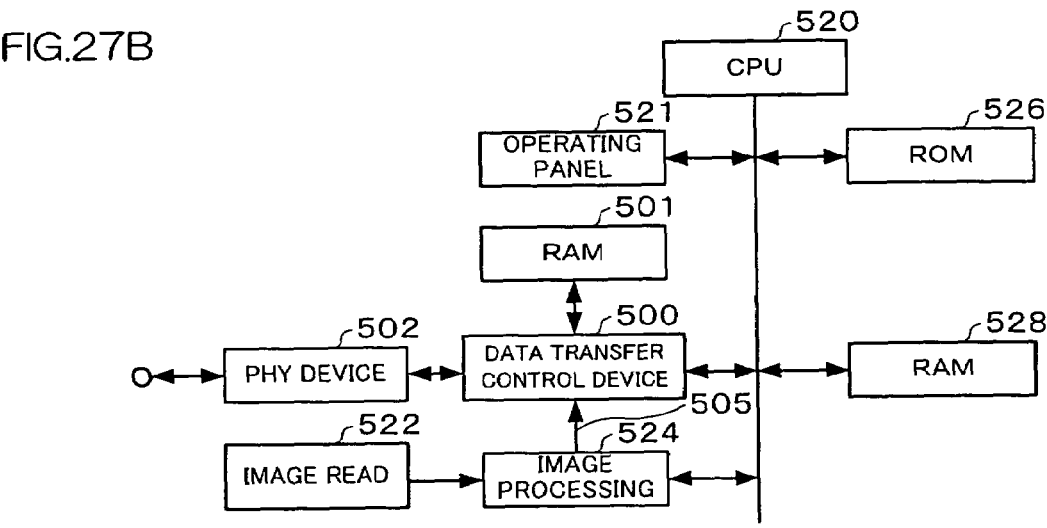
Figure 28B:
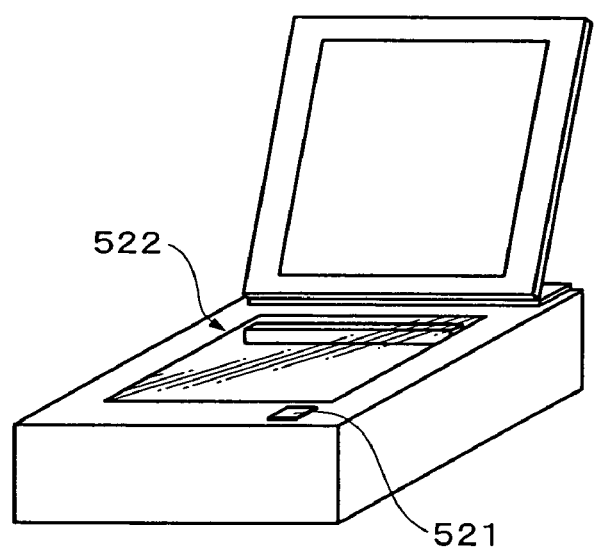

An internal block diagram of a scanner that is another example of electronic equipment is shown in FIG. 27B with an external view thereof being shown in FIG. 28B. A CPU 520 has various functions, including that of controlling the entire system. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY device 502 to another node such as a personal computer.

Figure 27C:
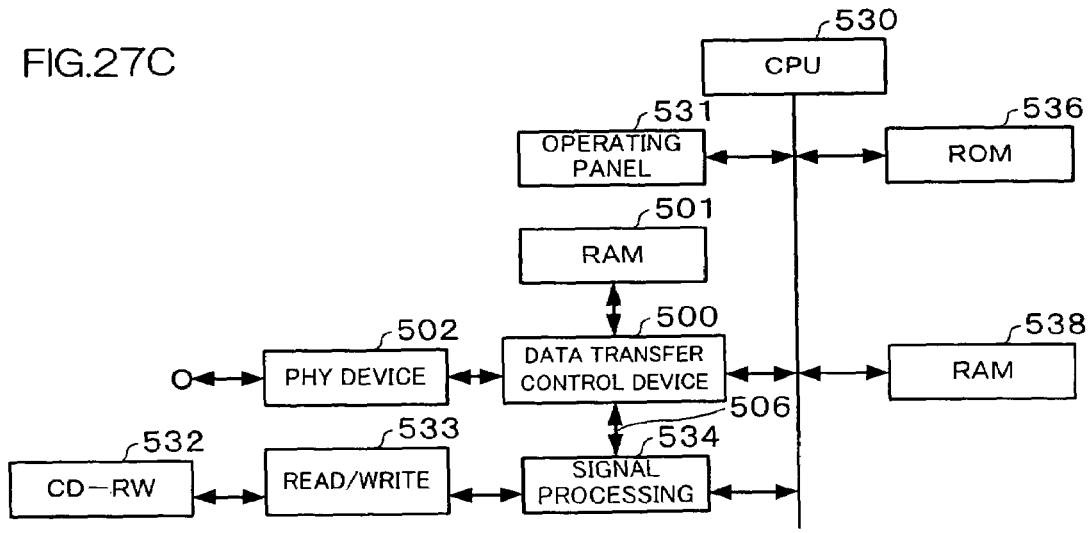
Figure 28C:
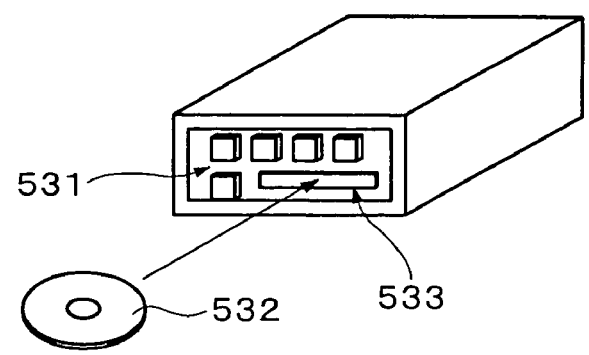

An internal block diagram of a CD-RW drive that is a further example of electronic equipment is shown in FIG. 27C with an external view thereof being shown in FIG. 28C. A CPU 530 has various functions, including that of controlling the entire system. An operating section 531 is designed to allow the user to operate the CD-RW. Data such as a control program is stored in a ROM 536 and a RAM 538 functions as a work area for the CPU 530.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets through the PHY chip 502 to another node such as a personal computer.

Data that has been sent in from another node through the PHY chip 502 and the data transfer control device 500, on the other hand, is sent directly to the signal processing section 534 over the bus 506. The data is subjected to given signal processing by the signal processing section 534 then is stored by the read/write section 533 into the CD-RW 532.

Note that a separate CPU for providing data transfer control with respect to the data transfer control device 500 could be provided in addition to the CPU 510, 520, or 530 of FIG. 27A, 27B, or 27C.

In addition, a RAM 501 (equivalent to the RAM 80 of FIG. 4) is shown provided outside the data transfer control device 500 in FIGS. 27A, 27B, and 27C, but the RAM 501 could equally well be provided within the data transfer control device 500.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-RW or write data to a CD-RW at high speeds. The present invention also makes it simple to use a plurality of items of electronic equipment connected to one host system or a plurality of items of electronic equipment connected to a plurality of host systems, for example.

Use of the data transfer control device of this embodiment in electronic equipment also reduces the processing load on firmware running on the CPU, making it possible to use an inexpensive CPU and low-speed buses. This also enables reductions in the cost and size of the data transfer control device, thus reducing the cost and size of the electronic equipment.

This configuration also makes it possible to prevent a situation in which normal data transfer between items of electronic equipment must wait for a long time is a bus reset is generated by the connection of new electronic equipment to the bus.

Note that the electronic equipment that can employ a data transfer control device in accordance with the present invention is not limited to the above described embodiments, and thus various other examples can be considered, such as various types of optical disk drive (CD-ROM or DVD), magneto-optic disk drives (MO), hard disk drives, TVs, VTRs, video cameras, audio equipment, telephones, projectors, personal computers, electronic organizers, and dedicated word processors.

Note also that the present invention is not limited to the embodiments described herein, and various modifications are possible within the scope of the invention as laid out herein.

For example, the configuration of the data transfer control device in accordance with the present invention can be that as shown in FIG. 4, but it is not limited thereto.

The present invention is particularly useful for bus resets in accordance with IEEE 1394, but it can equally well be applied to any reset whereby at least node topology information is cleared.

The pointer information of the present invention is not limited to the start addresses of packets, provided that at least boundaries within the packet storage means are specified thereby.

The method by which the packet storage means is divided is also not limited to that described with reference to FIG. 5.

Similarly, the present invention can be applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data between a plurality of nodes connected to a bus, the data transfer control device comprising:
    a circuit which generates identification information for determining whether or not one received packet and a next received packet are received during different reset intervals, when a reset interval is defined as the period between a reset that clears node topology information and the next reset;
    a write circuit which links each received packet with the generated identification information, and writes the received packet and identification information into a packet storage memory;
    a first pointer storage register which stores first pointer information that specifies a boundary in the packet storage memory between an area for a packet received before the occurrence of a reset that clears node topology information and an area for a packet received after the occurrence of the reset;
    wherein the identification information is a toggle bit that toggles from zero to one or from one to zero when one received packet and the next received packet are packets received within different reset intervals; and
    wherein the identification information for the one received packet is different than the identification for the next received packet.

2. The data transfer control device as defined in claim 1, wherein the packet storage memory is a randomly accessible storage memory and is divided into a control information area in which is stored packet control information and a data area in which is stored packet data; and
    wherein the identification information is included within the control information written to the control information area.

3. The data transfer control device as defined in claim 1, wherein a start address of the next packet after a packet that was received immediately before the occurrence of a reset is stored as the first pointer information in the first pointer storage register.

4. The data transfer control device as defined in claim 1, further comprising:
    a second pointer storage register which stores second pointer information which specifies a boundary in the packet storage memory between an area for processed packets and an area for unprocessed packets; and
    a third pointer storage register which stores third pointer information which specifies a boundary in the packet storage memory between an area for received packets and an area storing no received packets.

5. The data transfer control device as defined in claim 1, further comprising:
    a processing unit which specifies a packet received after the occurrence of the reset, based on the first pointer information stored in the first pointer storage register, and gives priority to processing the specified packet.

6. The data transfer control device as defined in claim 1, wherein the packet storage memory is a randomly accessible storage memory and is divided into a control information area in which is stored packet control information and a data area in which is stored packet data; and
    wherein the first pointer storage register includes:
    a fourth pointer storage register which stores fourth pointer information which specifies a boundary in the control information area between control information for a packet received before the occurrence of the reset that clears node topology information and control information for a packet received after the occurrence of the reset; and
    a fifth pointer storage register which stores fifth pointer information which specifies a boundary in the data area between data of a packet received before the occurrence of the reset that clears node topology information and data of a packet received after the occurrence of the reset.

7. The data transfer control device as defined in claim 6, wherein the data area has been divided into a first data area for storing first data for a first layer and a second data area for storing second data for a second layer; and
    wherein the fifth pointer information is pointer information which specifies a boundary in the first data area between the first data for a packet received before the occurrence of the reset that clears node topology information and the first data for a packet received after the occurrence of the reset.

8. The data transfer control device as defined in claim 1, comprising:
    a status storage register which stores status information indicating that the transmission of a packet has been halted, when the transmission of the packet has been halted by the occurrence of a reset that clears node topology information.

9. The data transfer control device as defined in claim 8, further comprising a processing unit which issues the transmission start command;

wherein the processing unit cancels transmission processing that has already started, without determining whether or not transmission has been completed, when it has been determined from the status information that transmission of a packet has been halted by the occurrence of the reset.

10. The data transfer control device as defined in claim 1, wherein the reset is a bus reset as defined by the IEEE 1394 standard.

11. Electronic equipment comprising:
a data transfer control device as defined in claim 1;
a device which performs given processing on data that has been received from another node through the data transfer control device and a bus; and
a device which outputs or stores data that has been subjected to processing.

12. Electronic equipment comprising:
a data transfer control device as defined in claim 1;
a device which performs given processing on data that is to be transferred to another node through the data transfer control device and a bus; and
a device which takes in data to be subjected to processing.

13. A data transfer control device for transferring data between a plurality of nodes connected to a bus, the data transfer control device comprising:
a circuit which generates identification information for determining whether or not one received packet and a next received packet are received during different reset intervals, when a reset interval is defined as the period between a reset that clears node topology information and the next reset;
a write circuit which links each received packet with the generated identification information, and writes the received packet and identification information into a packet storage memory;
wherein a changing point of the identification information specifies a boundary in the packet storage memory between an area for a packet received before the occurrence of a reset that clears node topology information and an area for a packet received after the occurrence of the reset;
wherein the identification information is a toggle bit that toggles from zero to one or from one to zero when one received packet and the next received packet are packets received within different reset intervals; and
wherein the identification information for the one received packet is different than the identification for the next received packet.

14. The data transfer control device as defined in claim 13, wherein the packet storage memory is a randomly accessible storage memory and is divided into a control information area in which is stored packet control information and a data area in which is stored packet data; and
wherein the identification information is included within the control information written to the control information area.

* * * * *